United States Patent
Moorhouse et al.

(10) Patent No.: US 9,303,103 B2
(45) Date of Patent: Apr. 5, 2016

(54) MODIFIED CHROMIUM-BASED CATALYSTS AND POLYMERIZATION PROCESSES FOR USING THE SAME

(75) Inventors: John H. Moorhouse, Kendall Park, NJ (US); Kevin J. Cann, Rocky Hill, NJ (US); Mark G. Goode, Hurricane, WV (US); Ronald S. Eisinger, Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 669 days.

(21) Appl. No.: 12/919,979

(22) PCT Filed: Dec. 10, 2008

(86) PCT No.: PCT/US2008/013547
§ 371 (c)(1),
(2), (4) Date: Aug. 27, 2010

(87) PCT Pub. No.: WO2009/108174
PCT Pub. Date: Sep. 3, 2009

(65) Prior Publication Data
US 2011/0010938 A1    Jan. 20, 2011

Related U.S. Application Data

(60) Provisional application No. 61/067,254, filed on Feb. 27, 2008.

(51) Int. Cl.
*B01J 21/00* (2006.01)
*B01J 23/00* (2006.01)
*C08F 4/24* (2006.01)
*C08F 4/52* (2006.01)
(Continued)

(52) U.S. Cl.
CPC ............... *C08F 10/00* (2013.01); *C08F 210/16* (2013.01); *Y10T 29/49345* (2015.01)

(58) Field of Classification Search
USPC .......... 502/256, 319, 320; 526/106, 185, 226, 526/352
See application file for complete search history.

(56) References Cited

U.S. PATENT DOCUMENTS 4,356,294 A * 10/1982 Rekers et al. ................. 526/100
5,075,395 A * 12/1991 Durand ................... C08F 10/00
526/105

(Continued)

FOREIGN PATENT DOCUMENTS

CN    1214344    4/1999
CN    1214344 A *  4/1999
(Continued)

OTHER PUBLICATIONS

English translation of CN 1214344 A.*

*Primary Examiner* — Alexa Neckel
*Assistant Examiner* — Elizabeth Eng
(74) *Attorney, Agent, or Firm* — Brooks, Cameron & Huebsch, PLLC

(57) ABSTRACT

Embodiments disclosed herein generally relate to olefin polymerization catalysts, and more specifically to chromium-based catalysts and methods of use of chromium-based catalysts for the production of polyolefins, and even more specifically to methods for controlling or tailoring the flow index response of chromium-based catalysts through the controlled addition of a reducing agent to the catalysts under controlled mixing conditions.

26 Claims, 4 Drawing Sheets

(51) Int. Cl.
*C08F 4/12* (2006.01)
*C08F 110/02* (2006.01)
*C08F 10/00* (2006.01)
*C08F 210/16* (2006.01)

(56) References Cited

U.S. PATENT DOCUMENTS 5,856,257 A * 1/1999 Freeman ............... B01J 31/122
  502/117

6,326,443 B1 * 12/2001 Monoi et al. ............... 526/129
6,646,069 B2    11/2003 Monoi et al.
2002/0042482 A1 *  4/2002 Monoi et al. ............... 526/106

FOREIGN PATENT DOCUMENTS

| JP | 2001-294612 | 10/2001 |
| JP | 2002-020412 | 1/2002 |
| WO | WO 94/13708 | 6/1994 |
| WO | WO 2004/060923 | 7/2004 |

* cited by examiner

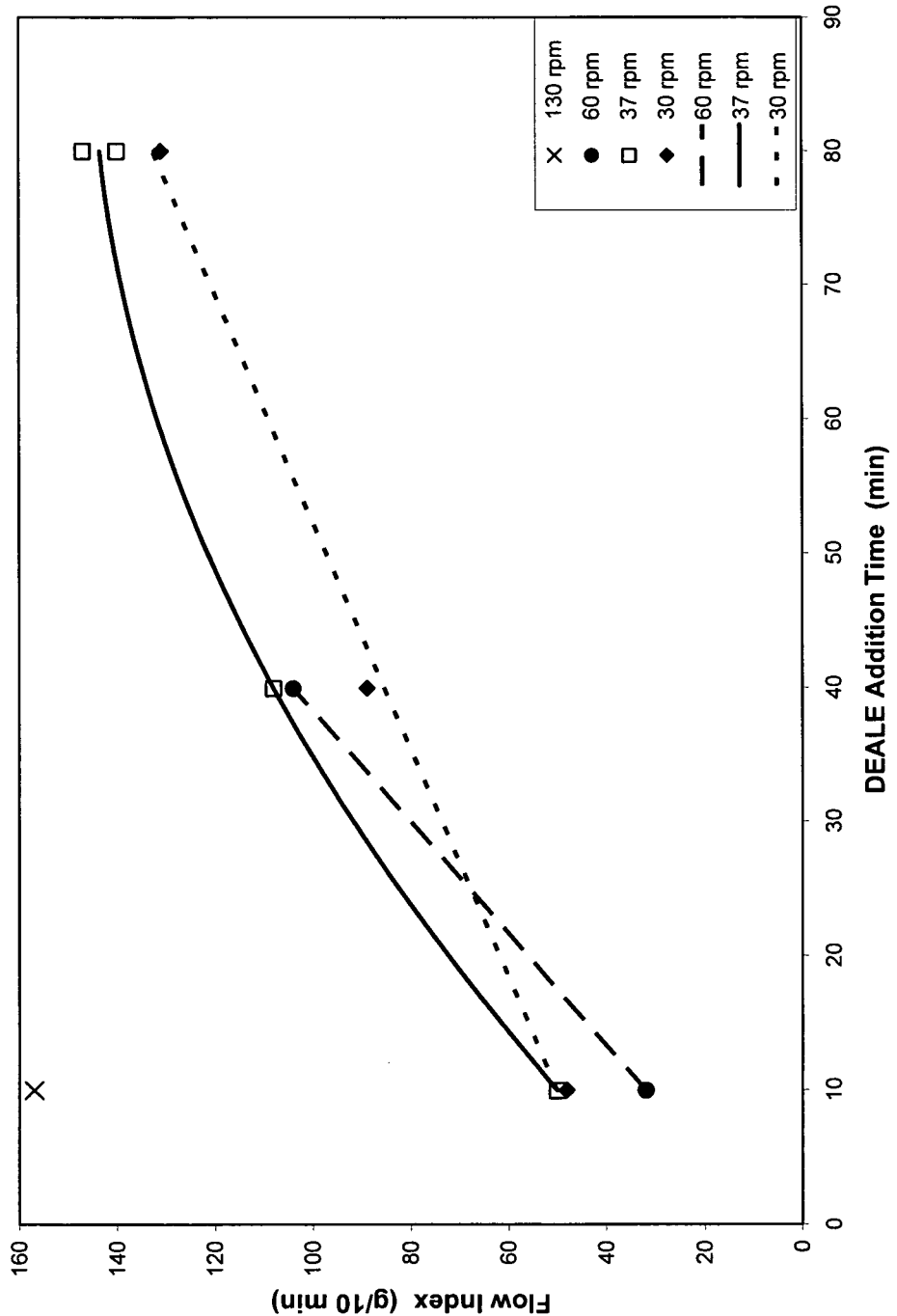

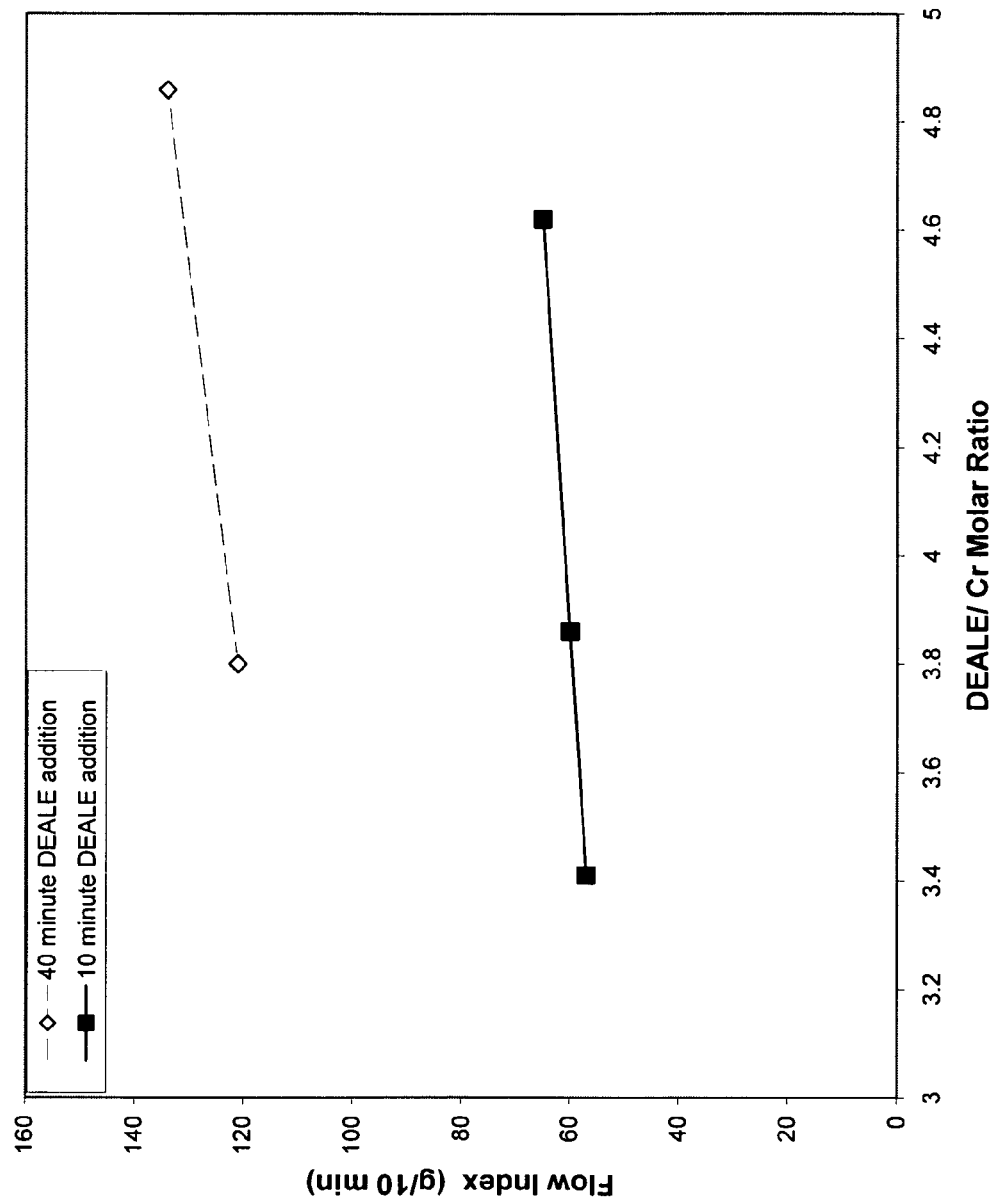

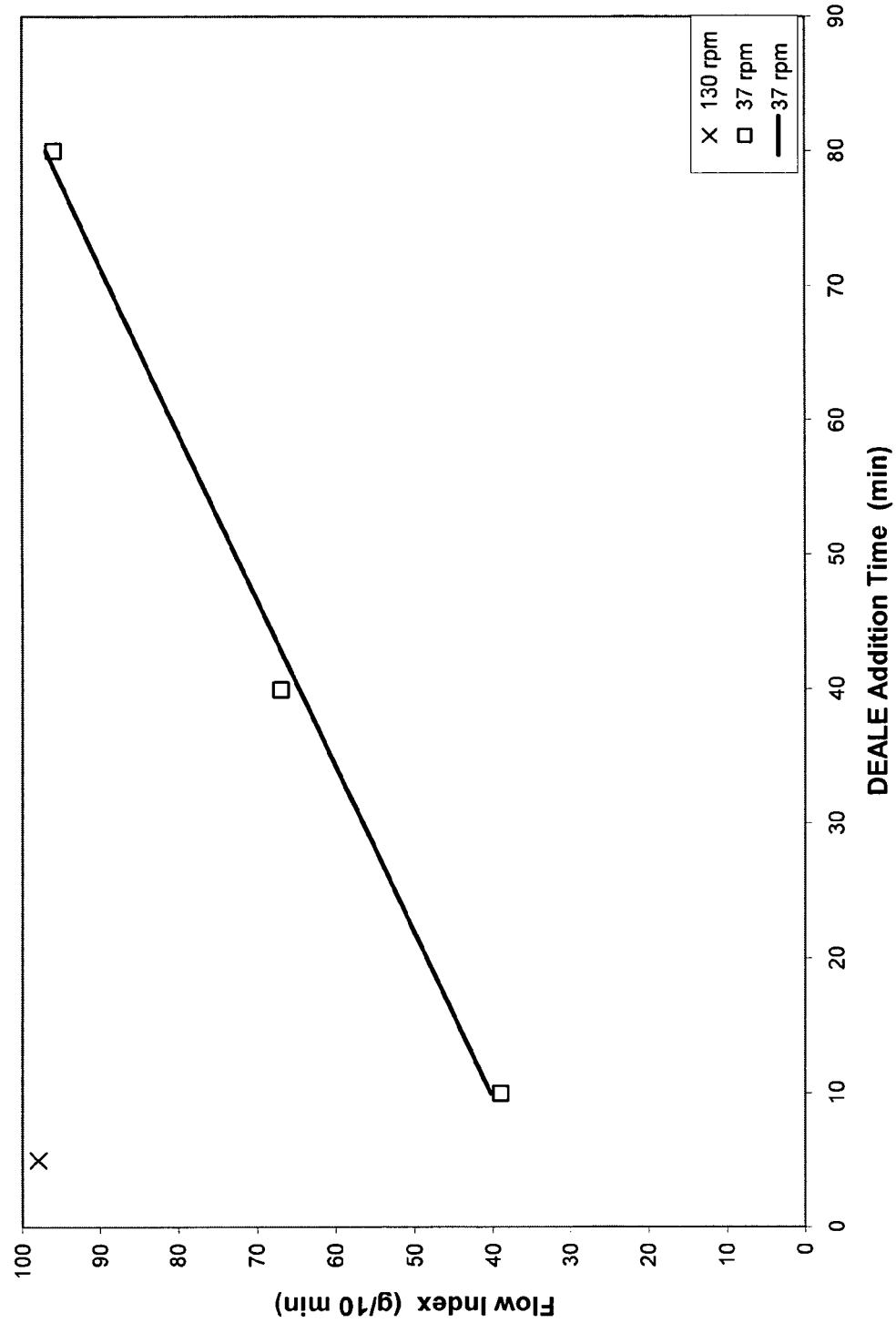

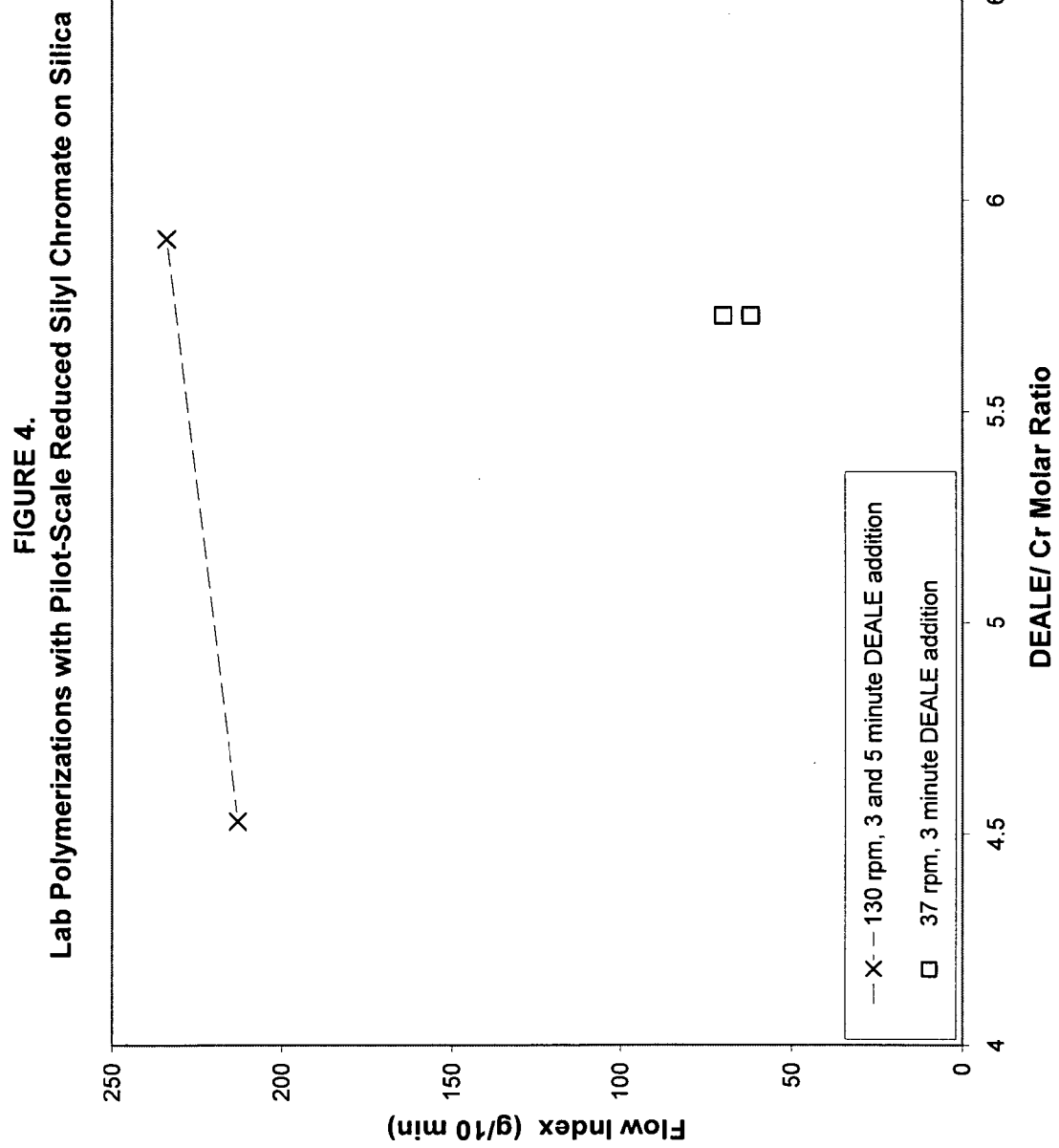

MODIFIED CHROMIUM-BASED CATALYSTS AND POLYMERIZATION PROCESSES FOR USING THE SAME

CROSS-REFERENCE TO RELATED APPLICATIONS

This application is a National Stage application under 36 U.S.C. §371 of International Application No. PCT/US2008/013547, filed Dec. 10, 2008, that claims the benefit of Ser. No. 61/067,254, filed Feb. 27, 2008, the disclosures of which are incorporated by reference in their entireties.

FIELD OF THE INVENTION

Embodiments disclosed herein generally relate to olefin polymerization catalysts, and more specifically to chromium-based catalysts and methods of use of chromium-based catalysts for the production of polyolefins, and even more specifically to methods for controlling or tailoring the flow index response of a chromium-based catalyst through the controlled addition of a reducing agent to the catalysts and/or addition of a reducing agent under controlled mixing conditions.

BACKGROUND

Polyolefins have been used extensively in a wide variety of applications inclusive of food packaging, textiles, and resin materials for various molded articles. Different polymer properties may be desired depending on the intended use of the polymer. For example, polyolefins having relatively low molecular weights and narrow molecular weight distributions are suitable for articles molded by an injection molding method. On the other hand, polyolefins having relatively high molecular weights and broad molecular weight distributions are suitable for articles molded by blow molding or inflation molding. For example, in many applications, medium-to-high molecular weight polyethylenes are desirable. Such polyethylenes have sufficient strength for applications which require such strength (e.g., pipe applications), and simultaneously possess good processing characteristics. Similarly, polyolefins having a particular flow index or within a particular flow index range are suitable for various applications.

Ethylene polymers having broad molecular weight distributions can be obtained by use of a chromium-based catalyst obtained by calcining a chromium compound carried on an inorganic oxide carrier in a non-reducing atmosphere to activate it such that, for example, at least a portion of the carried chromium atoms is converted to hexavalent chromium atoms ($Cr^{+6}$). This type of catalyst is commonly referred to in the art as the Phillips catalyst. The chromium compound is impregnated onto silica, dried to a free-flowing solid, and heated in the presence of oxygen to about 400° C.-860° C., converting most or all of the chromium from the +3 to the +6 oxidation state.

Another chromium-based catalyst used for high density polyethylene applications consists of silyl chromate (e.g., bis-triphenylsilyl chromate) chemisorbed on dehydrated silica and subsequently reduced with diethylaluminum ethoxide (DEAlE). The resulting polyethylenes produced by each of these catalysts are different with respect to some important properties. Chromium oxide-on-silica catalysts have good productivity (g PE/g catalyst), also measured by activity (g PE/g catalyst-hr) but often produce polyethylenes with molecular weight distributions narrower than that desired for applications such as large part blow molding, film, and pressure pipe. Silyl chromate-based catalysts produce polyethylenes with desirable molecular weight characteristics (broader molecular weight distribution with a high molecular weight shoulder on molecular weight distribution curve), but often may not have as high productivity or activity as chromium oxide-on-silica catalysts.

Monoi et al., in Japanese Patent Application 2002-020412, disclose the use of inorganic oxide-supported $Cr^{+6}$-containing solid components (A) prepared by activating under non-reducing conditions, then adding dialkylaluminum functional group-containing alkoxides (B) which contain an Al—O—C—X functional group in which X is either an oxygen or a nitrogen atom, and trialkylaluminum (C) to polymerize ethylene. The resulting ethylene polymers are said to possess good environmental stress crack resistance and good blow molding creep resistance.

Monoi et al., in U.S. Pat. No. 6,326,443, disclose the preparation of a polyethylene polymerization catalyst using a chromium compound, adding an organic aluminum compound more rapidly than specified by a certain mathematical formula, and drying the resulting product at a temperature not higher than 60° C. more rapidly than specified by another mathematical formula. Both formulae are expressed as functions of batch size. Monoi teaches that by minimizing the addition time of the organic aluminum compound and the drying time, a catalyst with high activity and good hydrogen response is obtained.

Monoi et al., in U.S. Pat. No. 6,646,069, disclose a method of ethylene polymerization in co-presence of hydrogen using a trialkylaluminum compound-carried chromium-based catalyst, wherein the chromium-based catalyst is obtained by activating a chromium compound carried on an inorganic oxide carrier by calcination in a non-reducing atmosphere to convert chromium atoms into the +6 state, treating the resulting substance with a trialkylaluminum compound in an inert hydrocarbon solvent, and then removing the solvent.

Hasebe et al., in Japanese Patent Publication 2001-294612, disclose catalysts containing inorganic oxide-supported chromium compounds calcined at 300° C.-1100° C. in a non-reducing atmosphere, $R_{3-n}AlL_n$ (R=$C_1$-$C_{12}$ alkyl; L=$C_1$-$C_8$ alkoxy or phenoxy; and 0<n<1), and Lewis base organic compounds. The catalysts are said to produce polyolefins with high molecular weight and narrow molecular weight distribution.

Da et al, in Chinese Patent 1214344, teach a supported chromium-based catalyst for gas-phase polymerization of ethylene prepared by impregnating an inorganic oxide support having hydroxyl group on the surface with an inorganic chromium compound aqueous solution; drying in air; activating the particles in an oxygen-containing atmosphere; and reducing the activated catalyst intermediate with an organic aluminum compound.

Durand et al., in U.S. Pat. No. 5,075,395, teach a process for elimination of the induction period in the polymerization of ethylene by bringing ethylene in contact under fluidized-bed polymerization conditions and/or stirred mechanically, with a charge powder in the presence of a catalyst comprising a chromium oxide compound associated with a granular support and activated by thermal treatment, this catalyst being used in the form of a prepolymer. The Durand process is characterized in that the charge powder employed is previously subjected to a treatment by contacting the charge powder with an organoaluminum compound in such a way that the polymerization starts up immediately after the contacting of the ethylene with the charge powder in the presence of the prepolymer.

The above described chromium-based catalysts may be used to produce select grades of polymers. Very often, polymerization reactors are required to produce a broad range of products, having flow indices that may vary from 0.1 dg/min to about 100 dg/min.

Thus, there currently exists a need for processes that allow increasing and decreasing the flow index response beyond the inherent process range of a given chromium-based catalyst. There exists a need for processes that produce chromium-based catalysts with adjustable, but predictable, flow index responses. The flow index response of a chromium-based catalyst refers to the range of the flow index of the polymer made by the catalyst under a given set of polymerization conditions.

SUMMARY

In one aspect, embodiments disclosed herein relate to processes for producing a catalyst composition for use in the polymerization of olefins, the process including concurrently a) contacting a supported chromium-based catalyst with a reducing agent fed at a selected feed rate over a selected time period, and b) agitating the chromium-based catalyst at a selected agitation rate, to produce a catalyst composition having a flow index response within a selected range.

In one aspect, embodiments disclosed herein relate to processes for producing a catalyst composition for use in the polymerization of olefins, the process including concurrently a) contacting a supported chromium-oxide catalyst with a reducing agent fed at a selected feed rate over a selected time period, and b) agitating the chromium-based catalyst at a selected agitation rate, to produce a catalyst composition having a flow index response within a selected range.

In one aspect, embodiments disclosed herein relate to processes for producing a catalyst composition for use in the polymerization of olefins, the process including concurrently a) contacting a silica supported silyl chromate catalyst with a reducing agent fed at a selected feed rate over a selected time period, and b) agitating the chromium-based catalyst at a selected agitation rate, to produce a catalyst composition having a flow index response within a selected range.

In another aspect, embodiments disclosed herein relate to a catalyst composition, including a supported chromium-based catalyst and a reducing agent, formed by a process including concurrently contacting a supported chromium-based catalyst with a reducing agent fed at a selected feed rate over a selected time period and agitating the chromium based catalyst at a selected agitation rate, wherein the resulting catalyst composition has a flow index response within a selected range.

In yet another aspect, embodiments disclosed herein relate to a process for producing a polyolefin, the process including: concurrently contacting a supported chromium-based catalyst with a reducing agent fed at a selected feed rate over a selected time period and agitating the chromium-based catalyst at a selected agitation rate to produce a catalyst composition has a flow index response within a selected range; and contacting the catalyst composition with olefins under polymerization conditions.

Other aspects and advantages of the invention will be apparent from the following description and the appended claims.

BRIEF DESCRIPTION OF DRAWINGS

FIG. 1 shows laboratory polymerization results on the effect of DEAlE addition time and agitation rate on the flow index response of a chromium-based catalyst manufactured on a pilot scale using 957HS chromium on silica support, according to embodiments described herein.

FIG. 2 shows laboratory polymerization results on the effect of DEAlE addition time on the flow index response of a chromium-based catalyst manufactured on a commercial scale using 957HS chromium on silica support at several DEAlE/Cr molar ratios, according to embodiments described herein.

FIG. 3 shows laboratory polymerization results on the effect of DEAlE addition time and agitation rate on the flow index response of a chromium-based catalyst manufactured on a pilot scale using C35300MS chromium on silica support, according to embodiments described herein.

FIG. 4 shows laboratory polymerization results on the effect of agitation rate on the flow index response of a silyl chromate-based catalyst manufactured on a pilot scale at several DEAlE/Cr molar ratios, according to embodiments described herein.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, catalyst structures, or the like, as such may vary, unless otherwise specified. It is also to be understood that the terminology used herein is for the purpose of describing particular embodiments only and is not intended to be limiting.

Generally, embodiments disclosed herein relate to controlling or tailoring the flow index response of supported chromium-based catalysts. In one aspect, embodiments disclosed herein relate to chromium-based catalyst compositions used in the polymerization of olefins, wherein the chromium-based catalyst composition has a flow index response within a selected range. In another aspect, embodiments disclosed herein relate to a process for producing such chromium-based catalyst compositions by contacting the chromium-based catalyst with a reducing agent at a selected feed rate, over a selected time period, and optionally, at a selected agitation rate, to result in a chromium-based catalyst composition having a flow index response within a selected range. In yet another aspect, embodiments disclosed herein relate to a process of polymerizing olefins comprising using a chromium-based catalyst composition having a flow index response within a selected range by contacting the chromium-based catalyst composition with olefins under polymerization conditions. Selected feed rates, as used herein, refers to the rate of addition of the reducing agent, including constant feed rates, intermittent feed, ramped or varied feed rates, etc. over the time period of addition during catalyst manufacture.

The inventors have surprisingly found that the addition rate of a reducing agent, such as, for example, DEAlE, to a chromium-based catalyst, such as supported silyl chromate or chromium oxide catalysts, and the agitation rate during the addition of and reaction of reducing agent influences the flow index response of the catalyst. As used herein, "flow index response" means that under a certain set of polymerization reaction conditions, such as, for example, using the General Laboratory Testing Procedure for Catalysts given in the Examples below, the catalyst produces a polymer within a certain molecular weight range.

The molar ratio of DEAlE/Cr in the catalyst, reaction temperature, residence time, trace oxygen add-back concentration, and comonomer and hydrogen ratios to ethylene may each affect the molecular weight of the polymer made by the catalyst. When the catalyst is prepared consistently and all the polymerization process variables are held constant, a catalyst of certain formulation should make the same polymer; minor variations, such as within a given control tolerance, in the preparation and process variables should result in a similar polymer. Thus, control of the flow index response of a catalyst to a certain molecular weight range may be attained according to embodiments disclosed herein.

Polymer flow index is inversely related to polymer molecular weight and will be used as an indicator of molecular weight. The flow index response may be modified herein using terms such as "high," "medium," or "low" to indicate the relative range of the flow index of the resulting polymer made under a given set of polymerization conditions as compared to similar chromium-based catalyst compositions produced using varying reducing agent feed rates, time periods for addition of the reducing agent, and/or agitation rates. For example, for a given chromium-based catalyst composition produced using two different selected DEAlE feed rates over a selected time period, one catalyst may have a low flow index response, producing a high molecular weight polymer, while the other may have a high flow index response, producing a low molecular weight polymer. These relative terms should not be used to compare different chromium-based catalysts, but should only be used to differentiate the flow index response for a given chromium-based catalyst as produced using processes as disclosed herein.

Polymer melt index is another indicator of polymer molecular weight. Melt index is a measure of the polymer fluidity and is also inversely related to molecular weight. The higher the melt index, the higher the relative termination of chains relative to propagation, and therefore the lower the molecular weight.

The inventors have found that reducing agent feed rate, in some embodiments, or that reducing agent feed rate and agitation rate, in other embodiments, during addition of and reaction of the reducing agent have surprisingly strong effects on the flow index response of the catalysts. It may be necessary to maintain tight control over these parameters to produce batches of catalyst with a consistent flow index response. Furthermore, the flow index response may be beneficially varied to produce catalysts suitable for production of polyethylene for different applications by carefully selecting reducing agent addition rates and agitation rates.

It has been found that for a selected reducing agent/Cr ratio, the flow index response of a chromium-based catalyst may be affected by the addition of the reducing agent, including the feed rate and the time period over which the reducing agent is added. For example, the flow index response has been found to increase with a slower rate of addition of the reducing agent. Also, the flow index response has been found to increase with a faster rate of agitation during addition and reaction of the reducing agent, or a combination of slower rate of addition and faster rate of agitation. Consequently, in applications where the desired flow index response is low, the reducing agent may be added at a high feed rate over a short time period and/or the agitation rate decreased. Conversely, for applications where the desired flow index response is high, the reducing agent may be added at a lower feed rate over a longer period of time and/or the agitation rate increased.

Although examples of embodiments disclosed herein include chromium oxide and silyl chromate catalysts, the scope of the disclosure should not be limited thereby. One of skill in the art would appreciate that the addition of the reducing agent could be tailored to produce a desired flow index response of any chromium-based catalyst.

Catalysts useful in embodiments disclosed herein include chromium-based catalysts, such as chromium oxide and silyl chromate-based catalysts. The catalyst system chosen for the polymerization often dictates polymer properties such as molecular weight, molecular weight distribution, and flow index.

Chromium oxide-based catalysts, for example, Phillips-type catalysts, may be formed by impregnating a $Cr^{+3}$ species into silica, followed by calcination of the silica support under oxidizing conditions at about 300 to 900° C., and at about 400 to 860° C. in other embodiments. Under these conditions, at least some of the $Cr^{+3}$ is converted to $Cr^{+6}$. The Phillips catalyst is also commonly referred to in the prior art as "inorganic oxide-supported Cr(+6)."

Silyl chromate catalysts are another type of inorganic oxide-supported $Cr^{+6}$ catalysts which tend to produce polyethylenes with improved properties for a number of applications. The silyl chromate catalyst may be formed by dehydrating silica at about 400 to 850° C. in air or nitrogen, followed by contacting for specified time a silyl chromate compound, such as bis(triphenylsilyl) chromate, with the silica slurried in inert hydrocarbon solvent, then reacting the resulting product with an alkyl aluminum alkoxide, such as diethylaluminum ethoxide (DEAlE), for example, and then drying the resulting catalyst product to remove the solvent therefrom.

Cann et al., in U.S. Publication No 2005/0272886, teaches the use of aluminum alkyl activators and co-catalysts to improve the performance of chromium-based catalysts. The addition of aluminum alkyls allow for variable control of side branching, and desirable productivities, and these compounds may be applied to the catalyst directly or added separately to the reactor. Adding the aluminum alkyl compound directly to the polymerization reactor (in-situ) eliminates induction times.

The inventors have advantageously found that by adjusting the addition of a reducing agent (including the feed rate and the time period over which the reducing agent is added), such as DEAlE, to the chromium-based catalyst, and optionally the agitation rate, flow index response may be tailored. Flow index is an important parameter for polyolefins applications. The flow index is a measure of the ease of flow of the melt of a thermoplastic polymer. Flow index, or $I_{21}$, as used herein is defined as the weight of polymer in grams flowing in 10 minutes through a capillary of specific diameter and length by a pressure applied via a 21.6 kg load at 190° C. and is usually measured according to ASTM D-1238. $I_2$ and $I_5$ are similarly defined, where the pressure applied is by a load of 2.16 kg or 5 kg loads, respectively. $I_2$ is also referred to as melt index.

The flow index is therefore a measure of the ability of a material to flow under pressure and temperature. Flow index is an indirect measure of molecular weight, with high flow index corresponding to low molecular weight. At the same time, flow index is inversely proportional to the viscosity of the melt at the conditions of the test, and ratios between two flow index values such as the ratio of $I_{21}$ to $I_2$ for one material, is often used as a measure for the broadness of the molecular weight distribution.

Flow index is thus a very important parameter for polyolefins. Different flow indices may be desirable for different applications. For applications such as lubricants, injection molding, and thin films, a higher flow index polyolefin may be desired, while for applications such as pipe, large drums, pails or automobile gasoline tanks, a lower flow index polyolefin may be desired. Polyolefins for a given application should therefore have a flow index sufficiently high to easily form the polymer in the molten state into the article intended, but also sufficiently low so that the mechanical strength of the final article will be adequate for its intended use.

Reactor process variables may be adjusted to obtain the desired polymer flow index and melt index when using prior art chromium-based catalysts for which the flow index response was not tailored as according to embodiments disclosed herein. For example, increasing the temperature of polymerization is known to enhance the rate of termination, but have a comparatively minor effect on the rate of propagation, as reported in M. P. McDaniel, Advances in Catalysis, Vol. 33 (1985), pp 47-98. This results in more short chain polymers and an increase in melt index and flow index. Catalysts having a low flow index response therefore often require higher reactor temperatures, higher oxygen add-back, and higher hydrogen concentrations to produce a polymer of a given flow index.

However, there are limits on the range over which reactor process variables may be adjusted, such as, for example, reactor temperature, hydrogen and oxygen levels, without adversely affecting the polymerization process or the catalyst productivity. For example, excessively high reactor temperatures may approach the softening or melting point of the formed polymer. This may then result in polymer agglomeration and reactor fouling. Alternatively, low reactor temperatures may lead to a smaller temperature differential with respect to the cooling water, less efficient heat removal, and ultimately lowered production capacity. Further, high oxygen add-back concentrations may lead to reduced catalyst productivity, smaller average polymer particle size, and higher fines which may contribute to reactor fouling. Additionally, variations in hydrogen concentrations may impact polymer properties such as, for example, die swell which may in turn affect the suitability of a polymer for its desired application. Accordingly, adjusting reactor variables to approach operational limits may result in operational problems which may lead to premature reactor shutdown and downtime due to extensive clean-up procedures, as well as undesired gels and other undesired properties of the resulting polymer product.

It may also be possible with some chromium-based catalysts to increase the flow index response by increasing the DEAlE/Cr molar ratio, but this may be economically costly because it often requires additional costs for increased usage of raw material. Furthermore, at high levels of DEAlE, the catalyst may become more hazardous to handle and transport due to the potential increased reactivity with oxygen.

The ability to tailor catalyst flow index response by adjusting the feed rate and time period for addition of the reducing agents alone or in combination with adjusting the agitation rate during reducing agent addition and reaction, as provided by embodiments of the present disclosure, may therefore avoid increased safety hazards, operational difficulties, reactor shutdowns, and less economical catalyst preparation processes and polymerization conditions. This ability to tailor catalyst flow index response may enable catalysts that produce polymers with the desired properties to be more easily made.

The chromium-based catalyst compositions disclosed herein may comprise chromium-based catalysts and reducing agents. The chromium-based catalysts used in embodiments of the present disclosure may include chromium oxide catalysts, silyl chromate catalysts, or a combination of both chromium oxide and silyl chromate catalysts.

The chromium compounds used to prepare chromium oxide catalysts may include $CrO_3$ or any compound convertible to $CrO_3$ under the activation conditions employed. Many compounds convertible to $CrO_3$ are disclosed in U.S. Pat. Nos. 2,825,721, 3,023,203, 3,622,251, and 4,011,382 and include chromic acetyl acetonate, chromic halide, chromic nitrate, chromic acetate, chromic sulfate, ammonium chromate, ammonium dichromate, or other soluble, chromium containing salts. In some embodiments, chromic acetate may be used.

The silyl chromate compounds used to prepare the silyl chromate catalysts disclosed herein may include bis-triethylsilyl chromate, bis-tributylsilyl chromate, bis-triisopentylsilyl chromate, bis-tri-2-ethylhexylsilyl chromate, bis-tridecylsilyl chromate, bis-tri(tetradecyl)silyl chromate, bis-tribenzylsilyl chromate, bis-triphenylethylsilyl chromate, bis-triphenylsilyl chromate, bis-tritolylsilyl chromate, bis-trixylylsilyl chromate, bis-trinaphthylsilyl chromate, bis-triethylphenylsilyl chromate, bis-trimethylnaphthylsilyl chromate, polydiphenylsilyl chromate, and polydiethylsilyl chromate. Examples of such catalysts are disclosed, for example, in U.S. Pat. Nos. 3,324,101, 3,704,287, and 4,100,105, among others. In some embodiments, bis-triphenylsilyl chromate, bis-tritolylsilyl chromate, bis-trixylylsilyl chromate, and bis-trinaphthylsilyl chromate may be used. In other embodiments, bis-triphenylsilyl chromate may be used.

In some embodiments of the present disclosure, the silyl chromate compounds may be deposited onto conventional catalyst supports or bases, for example, inorganic oxide materials. In some embodiments of the present disclosure, the chromium compound used to produce a chromium oxide catalyst may be deposited onto conventional catalyst supports. The term "support," as used herein, refers to any support material, a porous support material in one exemplary embodiment, including inorganic or organic support materials. In some embodiments, desirable carriers may be inorganic oxides that include Group 2, 3, 4, 5, 13 and 14 oxides, and more particularly, inorganic oxides of Group 13 and 14 atoms. The Group element notation in this specification is as defined in the Periodic Table of Elements according to the IUPAC 1988 notation (IUPAC Nomenclature of Inorganic Chemistry 1960, Blackwell Publ., London). Therein, Groups 4, 5, 8, 9 and 15 correspond respectively to Groups IVB, VB, IIIA, IVA and VA of the Deming notation (Chemical Rubber Company's Handbook of Chemistry & Physics, 48th edition) and to Groups IVA, VA, IIIB, IVB and VB of the IUPAC 1970 notation (Kirk-Othmer Encyclopedia of Chemical Technology, 2nd edition, Vol. 8, p. 94). Non-limiting examples of support materials include inorganic oxides such as silica, alumina, titania, zirconia, thoria, as well as mixtures of such oxides such as, for example, silica-chromium, silica-alumina, silica-titania, and the like.

The inorganic oxide materials which may be used as a support in the catalyst compositions of the present disclosure are porous materials having variable surface area and particle size. In some embodiments, the support may have a surface area in the range of 50 to 1000 square meters per gram, and an average particle size of 20 to 300 micrometers. In some embodiments, the support may have a pore volume of about 0.5 to about 6.0 $cm^3/g$ and a surface area of about 200 to about 600 $m^2/g$. In other embodiments, the support may have a pore volume of about 1.1 to about 1.8 $cm^3/g$ and a surface area of about 245 to about 375 $m^2/g$. In some other embodiments, the support may have a pore volume of about 2.4 to about 3.7 $cm^3/g$ and a surface area of about 410 to about 620 $m^2/g$. In yet other embodiments, the support may have a pore volume of about 0.9 to about 1.4 $cm^3/g$ and a surface area of about 390 to about 590 $m^2/g$. Each of the above properties may be measured using conventional techniques as known in the art.

In some embodiments, the support materials comprise silica, particularly amorphous silica, and most particularly high surface area amorphous silica. Such support materials are commercially available from a number of sources. Such sources include the Davison Chemical Division of W.R. Grace and Company which markets silica support materials under the trade names of Davison 952 or Davison 955, and PQ Corporation, which markets silica support materials under various trade designations, including ES70. The silica is in the form of spherical particles, which are obtained by a spray-drying process. Alternatively, PQ Corporation markets silica support materials under trade names such as MS3050 which are not spray-dried. As procured, all of these silicas are not calcined (i.e., not dehydrated). However, silica that is calcined prior to purchase may be used in catalysts of the present disclosure.

In other embodiments, supported chromium compounds, such as, for example, chromium acetate, that are commercially available may also be used. Commercial sources include the Davison Chemical Division of W.R. Grace and Company which markets chromium on silica support materials under trade names such as Davison 957, Davison 957HS, or Davison 957BG, and PQ Corporation, which markets chromium on silica support materials under trade names such as ES370. The chromium on silica support is in the form of spherical particles, which are obtained by a spray-drying process. Alternatively, PQ Corporation markets silica support materials under trade names such as C35100MS and C35300MS which are not spray-dried. As procured, all of these silicas are not activated. However, if available, chromium supported on silica that is activated prior to purchase may be used in catalysts of the present disclosure.

Activation of the supported chromium oxide catalyst can be accomplished at nearly any temperature from about 300° C. up to the temperature at which substantial sintering of the support takes place. For example, activated catalysts may be prepared in a fluidized-bed, as follows. The passage of a stream of dry air or oxygen through the supported chromium-based catalyst during the activation aids in the displacement of any water from the support and converts, at least partially, chromium species to $Cr^{+6}$.

Temperatures used to activate the chromium-based catalysts are often high enough to allow rearrangement of the chromium compound on the support material. Peak activation temperatures of from about 300 to about 900° C. for periods of from greater than 1 hour to as high as 48 hours are acceptable. In some embodiments, the supported chromium oxide catalysts are activated at temperatures from about 400 to about 850° C., from about 500 to about 700° C., and from about 550 to about 650° C. Exemplary activation temperatures are about 600° C., about 700° C., and about 800° C. Selection of an activation temperature may take into account the temperature constraints of the activation equipment. In some embodiments, the supported chromium oxide catalysts are activated at a chosen peak activation temperature for a period of from about 1 to about 36 hours, from about 3 to about 24 hours, and from about 4 to about 6 hours. Exemplary peak activation times are about 4 hours and about 6 hours. Activation is typically carried out in an oxidative environment; for example, well dried air or oxygen is used and the temperature is maintained below the temperature at which substantial sintering of the support occurs. After the chromium compounds are activated, a powdery, free-flowing particulate chromium oxide catalyst is produced.

The cooled, activated chromium oxide catalyst may then be slurried and contacted with a reducing agent, fed at a selected feed rate over a selected time period, to result in a catalyst composition having a flow index response within a selected range. The solvent may then be substantially removed from the slurry to result in a dried, free-flowing catalyst powder, which may be fed to a polymerization system as is or slurried in a suitable liquid prior to feeding.

In a class of embodiments, because organometallic components used in the preparation of the catalysts and catalyst compositions of the present disclosure may react with water, the support material should preferably be substantially dry. In embodiments of the present disclosure, for example, where the chromium-based catalysts are silyl chromates, the untreated supports may be dehydrated or calcined prior to contacting with the chromium-based catalysts.

The support may be calcined at elevated temperatures to remove water, or to effectuate a chemical change on the surface of the support. Calcination of support material can be performed using any procedure known to those of ordinary skill in the art, and the present invention is not limited by the calcination method. One such method of calcination is disclosed by T. E. Nowlin et al., "Ziegler-Natta Catalysts on Silica for Ethylene Polymerization," J. Polym. Sci., Part A: Polymer Chemistry, vol. 29, 1167-1173 (1991).

For example, calcined silica may be prepared in a fluidized-bed, as follows. A silica support material (e.g. Davison 955), is heated in steps or steadily from ambient temperature to the desired calcining temperature (e.g. 600° C.) while passing dry nitrogen or dry air through or over the support material. The silica is maintained at about this temperature for about 1 to about 4 hours, after which it is allowed to cool to ambient temperature. The calcination temperature primarily affects the number of OH groups on the support surface; i.e., the number of OH groups on the support surface (silanol groups in the case of silica) is approximately inversely proportional to the temperature of drying or dehydration: the higher the temperature, the lower the hydroxyl group content.

In some embodiments of the present disclosure, support materials are calcined at a peak temperature from about 350° C. to about 850° C. in some embodiments, from about 400° C. to about 700° C. in other embodiments, and from about 500° C. to about 650° C. in yet other embodiments. Exemplary calcination temperatures are about 400° C., about 600° C., and about 800° C. In some embodiments, total calcination times are from about 2 hours to about 24 hours, from about 4 hours to about 16 hours, from about 8 hours to about 12 hours. Exemplary times at peak calcination temperatures are about 1 hour, about 2 hours, and about 4 hours.

The silyl chromate compound may then be contacted with the calcined support material in any of the ways known to one of ordinary skill in the art. In some embodiments, the silyl chromate compound may be contacted with the calcined support to form a "bound catalyst." The silyl chromate compound may be contacted with the support by any suitable means, such as in a solution, slurry, or solid form, or some combination thereof, and may be heated to any desirable temperature, for a specified time sufficient to effectuate a desirable chemical/physical transformation.

This contacting and transformation are usually conducted in a suitable non-polar solvent. Suitable non-polar solvents are materials which are liquid at contacting and transformation temperatures and in which some of the components used during the catalyst preparation, i.e., silyl chromate compounds and reducing agents are at least partially soluble. In some embodiments, the non-polar solvents are alkanes, particularly those containing about 5 to about 10 carbon atoms, such as pentane, isopentane, hexane, isohexane, n-heptane, isoheptane, octane, nonane, and decane. In other embodiments, cycloalkanes, particularly those containing about 5 to about 10 carbon atoms, such as cyclohexane and methylcyclohexane, may also be used. In yet other embodiments, the non-polar solvent may be a solvent mixture. Exemplary non-polar solvents are isopentane, isohexane, and hexane. In some embodiments isopentane may be used due to its low boiling point which makes its removal convenient and fast. The non-polar solvent may be purified prior to use, such as by degassing under vacuum and/or heat or by percolation through silica gel and/or molecular sieves, to remove traces of water, molecular oxygen, polar compounds, and other materials capable of adversely affecting catalyst activity.

The mixture may be mixed for a time sufficient to support or react the silyl chromate compound on the silica support. The reducing agent may then be contacted with this slurry, where the reducing agent is fed at a selected feed rate over a selected time period to result in a catalyst having a flow index response within a selected range. Alternatively, after supporting the silyl chromate compound on the support, and before adding the reducing agent, the solvent may then be substantially removed by evaporation, to yield a free-flowing supported silyl chromate on support. The thus supported silyl chromate may be re-slurried in the same or a different non-polar solvent and contacted with a reducing agent to result in a selected flow index response.

Once the catalyst is supported, and in the case of chromium oxide catalysts, activated, the chromium-based catalyst composition may then be slurried in a non-polar solvent, prior to the addition of the reducing agent. The supported catalyst may be chromium oxide supported catalysts, silyl chromate catalysts, or a mixture of both. This slurry is prepared by admixture of the supported catalyst with the non-polar solvent. In some embodiments, the supported silyl chromate compound is not dried before the addition of the reducing agent, but instead is left slurried in the non-polar solvent for reasons such as reduced costs.

The chromium-based catalysts of the present disclosure are then contacted with a reducing agent. Reducing agents used may be organoaluminum compounds such as aluminum alkyls and alkyl aluminum alkoxides. Alkyl aluminum alkoxides, of the general formula $R_2AlOR$, may be suitable for use in embodiments of this disclosure. The R or alkyl groups of the above general formula may be the same or different, may have from about 1 to about 12 carbon atoms in some embodiments, about 1 to about 10 carbon atoms in other embodiments, about 2 to about 8 carbon atoms in yet other embodiments, and about 2 to about 4 carbon atoms in further embodiments. Examples of the alkyl aluminum alkoxides include, but are not limited to, diethyl aluminum methoxide, diethyl aluminum ethoxide, diethyl aluminum propoxide, dimethyl aluminum ethoxide, di-isopropyl aluminum ethoxide, di-isobutyl aluminum ethoxide, methyl ethyl aluminum ethoxide and mixtures thereof. Although the examples almost exclusively use diethyl aluminum ethoxide (DEAlE), it should be understood that the disclosure is not so limited. In the examples that follow, where DEAlE is used, other aluminum alkyls or other alkyl aluminum alkoxides, or mixtures thereof may be used.

In some embodiments, the reducing agent may be added to a mixture of a supported silyl chromate catalyst with a non-polar solvent in a catalyst blender or other suitable catalyst preparation vessel. In other embodiments, the reducing agent may be added to a mixture of an activated chromium oxide catalyst with a non-polar solvent in a catalyst blender. In yet other embodiments, the reducing agent may be added to a mixture of silyl chromate catalysts and activated chromium oxide-based catalyst in a non-polar solvent in a catalyst blender. When both chromium oxide-based catalysts and silyl chromate-based catalysts are employed together in this disclosure, each catalyst is typically deposited on a separate support and receives different calcination or activation treatments prior to mixing together.

The addition of the reducing agent to the catalyst slurry may be conducted at elevated temperatures and under an inert atmosphere, such as up to 7 bar (100 psig) nitrogen head pressure. For example, the slurry may be maintained at a temperature between about 30 and 80° C. during admixture of the reducing agent. In other embodiments, the slurry may be maintained at a temperature between about 40 and about 60° C. In other embodiments, the slurry may be maintained at a temperature between about 40 and about 50° C., such as about 45° C.

To achieve a catalyst composition having a desired flow index response, or a flow index response within a selected range, and which makes polymer with desired attributes, the reducing agent may need to be well-dispersed over the catalyst mixture and throughout each particle. Alternatively, to obtain a catalyst composition which has a different flow index response or polymer with other attributes, the reducing agent may need to be non-uniformly dispersed over the catalyst particles and/or within each particle. The degree of non-uniformity may be determined by the desired polymer attributes (such as molecular weight and breadth of molecular weight distribution) and by the desired catalyst flow index response under a given set of reactor conditions. To this end, the reducing agent is added at a selected feed rate over a selected time period to the slurry of the chromium-based catalyst, where the slurry may be stirred at a selected agitation rate. For example, to achieve a catalyst composition with low flow index response, the total amount of reducing agent to be combined with the catalyst slurry may be added over a short time period and/or at a slow agitation rate. Conversely, to achieve a catalyst composition with a higher flow index response, the total amount of reducing agent may be added over a longer time period. In this case the agitation rate may be slow, medium, or rapid so as to further tailor the flow index response. In some embodiments, the reducing agent may be added over a time period ranging from 5 seconds to 120 minutes. In other embodiments, the reducing agent may be added over a time period ranging from 1 to 5 minutes. In other embodiments, the reducing agent may be added over a time period ranging from 5 to 15 minutes. In other embodiments, the reducing agent may be added over a time period ranging from 10 to 110 minutes. In yet other embodiments, the reducing agent may be added over a time period ranging from 30 to 100 minutes. For example, where the catalyst composition comprises a silyl chromate, the reducing agent may be added over a time period ranging from about 30 seconds to about 10 minutes. After the addition of the reducing agent, the reducing agent may be allowed to react with the catalyst slurry for a specified reaction time. In some embodiments, the reducing agent may be allowed to react with the catalyst slurry for a reaction time in the range of from about 5 minutes to about 240 minutes. In other embodiments, the reaction time may be in the range of from about 30 minutes to about 180 minutes.

It has also been found that the flow index response may be influenced by agitation. The inventors surprisingly found that catalyst preparations with similar ratios of reducing agent to chromium and made with equivalent addition rates and times, may result in catalysts having different flow index responses, resulting from differing degrees of agitation in the catalyst vessel during the addition and reaction of the reducing agent. Agitators useful for performing the agitation during catalyst preparation methods disclosed herein may include helical ribbon agitators and conical agitators. In some embodiments, agitators may include a combination-type agitator, such as combination of a helical ribbon type agitator or a conical agitator with an impeller, paddle, or other type of blending device, where the different agitator types may be operated at the same or different rpm's. It has been found that increased agitation rates provide catalysts with a higher flow index response compared with decreased agitation rates that provide catalysts with lower flow index response. One particular benefit for some embodiments is that higher agitation rates may be used to allow for the selected addition rate to be increased (and the selected addition time to be decreased) while resulting in a catalyst having an equivalent flow index response. As used herein, "agitation rate" generally refers to the specific rpm of the impeller for a ribbon blender or other agitation devices where agitator diameter does not play an important role in the degree of agitation achieved, and refers to the impeller tip speed for agitators where agitator diameter affects the degree of mixing, such as for an impeller. Agitation rates useful herein may be dependent on the size of the reactor and upon the type of impeller. In some embodiments, such as when using a helical ribbon impeller, the agitation rate may be in the range of from about 5 to about 200 rpm. In other embodiments, the agitation rate may be in the range of from about 10 to about 180 rpm; and from about 20 to about 50 rpm in yet other embodiments.

Reducing agent is typically added to the surface of the slurry. Other locations for added the reducing agent may be used to further tailor the flow index response of the catalyst. Selected feed rates and selected addition times may be interrupted briefly to allow for refill of a reducing agent addition vessel or to allow an empty reducing agent supply vessel to be replaced and coupled to the reducing agent addition vessel. It is not believed that this brief interruption in reducing agent flow significantly affects the resulting flow index response of the catalyst.

Thus, in some embodiments, contacting of the reducing agent and the chromium-based catalyst may occur at a selected reducing agent feed rate over a selected time and at a selected agitation rate, resulting in a catalyst composition having a flow index response within a selected range. For example, in commercial scale catalyst manufacturing equipment, increased agitation may provide a catalyst with higher flow index response yet allow the reducing agent to be added at faster rates, reducing batch cycle time and manpower needs. In another example, where existing commercial scale catalyst manufacturing equipment is limited in agitation rate, the reducing agent may be added slowly to obtain a desired tailoring to a high flow index response.

In some exemplary embodiments, the chromium-based catalyst may be a silica-supported chromium oxide catalyst. This silica-supported chromium oxide may be prepared from chromic acetate on silica precursors, commercially available under trade names such as 957HS, from Davison Chemical Division of W.R. Grace and Company, and C35100MS, or C3500MS, from PQ Corporation. The chromic acetate on silica precursors may be heated to temperatures of about 600° C. for about six hours under oxidizing conditions to produce a chromium oxide catalyst. A selected amount of DEAlE may then be added to the chromium oxide catalyst over an addition time period in the range of about 30 seconds to about 500 minutes, while agitating the resultant mixture at an agitation rate in the range of about 20 rpm to about 200 rpm. In other embodiments, the selected time period may be within the range from about 30 minutes to about 240 minutes; from about 60 minutes to about 180 minutes in other embodiments; and from about 90 to about 120 minutes in yet other embodiments. In some embodiments, a selected amount of DEAlE may be added to the chromium oxide catalyst over a time period in the range of about 40 to about 80 minutes, while agitating the resultant mixture at an agitation rate of 37 rpm. The mixture may then be allowed to react for a reaction time in the range of from about 30 minutes to about 180 minutes.

In other exemplary embodiments, the chromium-based catalyst may be a silica-supported silyl chromate catalyst. This silica-supported silyl chromate catalyst may be prepared from a silica support calcined at temperatures of about 600° C. for a time period in the range of from about one hour to about four hours and subsequently allowed to react with bis(triphenylsilyl)chromate. A selected amount of DEAlE may then be added to the silyl chromate catalyst over an addition time period in the range of about 0.5 to about 10 minutes, while agitating the resultant mixture at an agitation rate in the range of about 20 rpm to about 50 rpm. In some embodiments, a selected amount of DEAlE may be added to the chromium oxide catalyst over a time period in the range of about 1 to about 3 minutes, while agitating the resultant mixture at an agitation rate of 37 rpm. The mixture may then be allowed to react for a reaction time in the range of from about 30 minutes to about 180 minutes.

In various embodiments, the selected agitation rate may be less than 70 rpm and the selected reducing agent addition time may be less than 20 minutes. In other embodiments, the selected agitation rate may be greater than 70 rpm and the selected reducing agent addition time may be less than 20 minutes. In other embodiments, the selected agitation rate may be greater than 70 rpm and the selected reducing agent addition time may be greater than 20 minutes.

After addition of the reducing agent followed by a suitable period of time to allow for reaction, such as 0 to 2 hours, the catalyst slurry is heated further to remove the non-polar solvent. The drying process results in the slurry transitioning from a viscous slurry to a partially dried slurry or mud to a free-flowing powder. Accordingly, helical ribbon agitators may be used in vertical cylindrical blenders to accommodate the varying mixture viscosities and agitation requirements. The agitators may have single or double helical ribbons and may optionally include a central shaft auger or other more complex secondary agitator. Drying may be conducted at pressures above, below, or at normal atmospheric pressure as long as contaminants such as oxygen are strictly excluded. Drying temperatures may range from 0° C. to as much as 100° C. In some embodiments drying temperatures from about 40 to about 85° C. may be used. In some embodiments drying temperatures from about 55 to about 75° C. may be used. Drying times may range from about 1 to about 48 hours. In some embodiments drying times from about 3 to about 26 hours may be used. In some embodiments drying times from 5 to about 20 hours may be used. Following the drying process, the catalyst may be stored under an inert atmosphere until use.

As described above, the flow index response of chromium-based catalysts may be tailored to meet various commercial needs by the controlled addition of a reducing agent to a slurry of supported chromium solid in a non-polar solvent under controlled agitation. For a given chromium-based catalyst, the supported chromium solid may be slurried, contacted with a selected quantity of a reducing agent fed at a selected feed rate over a selected time period at a selected agitation rate, resulting in a desired chromium to reducing agent ratio, and resulting in the chromium-based catalyst having a selected flow index response and making polymer with desired polymer attributes. The solvent used to slurry the catalyst may then be removed, such as by drying, to result in a dry, free-flowing catalyst composition. This catalyst composition may then be fed to a polymerization reactor as is or slurried in a suitable liquid prior to feeding to a polymerization reactor.

Although the general procedure outlined above may apply to chromium catalysts in general, the procedure may be altered according to the particular type of chromium-based catalyst being used. For example, the above procedure may be manipulated for silyl chromate-based catalysts and for chromium oxide-based catalysts, the latter typically requiring an activating step or an oxidizing step to generate the desired $Cr^{+6}$ species prior to reduction. Additionally, the process may be adjusted depending upon whether the entire catalyst preparation is conducted, or whether a supported chromium compound is purchased and treated according to embodiments described herein.

Chromium-based catalysts formed by the above described processes may have a chromium loading on the support ranging from about 0.15 to about 3 weight percent in some embodiments; from about 0.2 to about 0.3 weight percent in other embodiments; from about 0.4 to about 0.6 weight percent in other embodiments; and from 0.7 to about 1.2 weight percent in other embodiments. Chromium-based catalysts formed by the above described processes may have a reducing agent to chromium molar ratio ranging from about 0.5 to about 8 in some embodiments; from about 2 to about 7 in other embodiments; and from about 3.0 to about 5.5 in yet other embodiments.

Polymerization Processes

Catalysts formed by the above described processes are suitable for use in the polymerization of olefins by any suspension, solution, slurry, or gas phase process, using known equipment and reaction conditions, and are not limited to any specific type of polymerization system. Generally, olefin polymerization temperatures may range from about 0 to about 300° C. at atmospheric, sub-atmospheric, or super-atmospheric pressures. In particular, slurry or solution polymerization systems may employ sub-atmospheric, or alternatively, super-atmospheric pressures, and temperatures in the range of about 40 to about 300° C.

Liquid phase polymerization systems such as those described in U.S. Pat. No. 3,324,095, may be used in embodiments of this disclosure. Liquid phase polymerization systems generally comprise a reactor to which olefin monomers and catalyst compositions are added. The reactor contains a liquid reaction medium which may dissolve or suspend the polyolefin product. This liquid reaction medium may comprise an inert liquid hydrocarbon which is non-reactive under the polymerization conditions employed, the bulk liquid monomer, or a mixture thereof. Although such an inert liquid hydrocarbon may not function as a solvent for the catalyst composition or the polymer obtained by the process, it usually serves as solvent for the monomers used in the polymerization. Inert liquid hydrocarbons suitable for this purpose may include isobutane, isopentane, hexane, cyclohexane, heptane, octane, benzene, toluene, and mixtures and isomers thereof. Reactive contact between the olefin monomer and the catalyst composition may be maintained by constant stirring or agitation. The liquid reaction medium which contains the olefin polymer product and unreacted olefin monomer is withdrawn from the reactor continuously. The olefin polymer product is separated, and the unreacted olefin monomer and liquid reaction medium are typically recycled and fed back into the reactor.

Some embodiments of this disclosure may be especially useful with gas phase polymerization systems, at superatmospheric pressures in the range from 0.07 to 68.9 bar (1 to 1000 psig), from 3.45 to 27.6 bar (50 to 400 psig) in some embodiments, from 6.89 to 24.1 bar (100 to 350 psig) in other embodiments, and temperatures in the range from 30 to 130° C., or from 65 to 110° C., from 75 to 120° C. in other embodiments, or from 80 to 120° C. in other embodiments. In some embodiments, operating temperatures may be less than 112° C. Stirred or fluidized bed gas phase polymerization systems may be of use in embodiments of this disclosure.

Generally, a conventional gas phase, fluidized bed process is conducted by passing a stream containing one or more olefin monomers continuously through a fluidized bed reactor under reaction conditions and in the presence of a catalyst composition at a velocity sufficient to maintain a bed of solid particles in a suspended state. A stream containing unreacted monomer is continuously withdrawn from the reactor, compressed, cooled, optionally partially or fully condensed, and recycled back to the reactor. Product is withdrawn from the reactor and replacement monomer is added to the recycle stream. Gases inert to the catalyst composition and reactants may also be present in the gas stream. The polymerization system may comprise a single reactor or two or more reactors in series.

Feed streams may include olefin monomer, non-olefinic gas such as nitrogen and hydrogen, and may further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof The feeds may enter the reactor at a single or multiple and different locations.

Further, the polymerization process is typically conducted substantially in the absence of catalyst poisons such as moisture, oxygen, carbon monoxide and acetylene. However, oxygen can be added back to the reactor at very low concentrations to alter the polymer structure and its product performance characteristics. Oxygen may be added at a concentration relative to the ethylene feed rate to the reactor of about 10 to 600 ppbv, and more preferably about 10 to 500 ppbv. Organometallic compounds may be employed as scavenging agents to remove catalyst poisons, thereby increasing the catalyst activity, or for other purposes. Examples of organometallic compounds that may be added include metal alkyls, such as aluminum alkyls. Conventional adjuvants may also be used in the process, provided they do not interfere with the mechanism of the catalyst composition in forming the desired polyolefin. For the purpose of polymerization with chromium-based catalysts of the current invention, the gas mole ratio of hydrogen to ethylene in the reactor may be in the range of about 0 to 0.5, in the range of 0.01 to 0.4 and in the range of 0.03 to 0.3. In some embodiments, hydrogen gas may be added. The use of hydrogen affects the polymer molecular weight and distribution, and ultimately influences the polymer properties.

An illustrative catalyst reservoir suitable for continuously feeding dry catalyst powder into the reactor is shown and described in U.S. Pat. No. 3,779,712, for example. A gas that is inert to the catalyst, such as nitrogen or argon, is preferably used to carry the catalyst into the bed. In another embodiment the catalyst is provided as a slurry in mineral oil or liquid hydrocarbon or mixture such, as for example, propane, butane, isopentane, hexane, heptane or octane. An illustrative catalyst reservoir is shown and described in WO 2004094489. The catalyst slurry may be delivered to the reactor with a carrier fluid, such as, for example, nitrogen or argon or a liquid such as for example isopentane or other $C_3$ to $C_8$ alkane.

In order to achieve the desired density ranges in the copolymers it is necessary to copolymerize enough of the comonomers with ethylene to achieve a level of about 0 to anywhere from 5 to 10 weight percent of the comonomer in the copolymer. The amount of comonomer needed to achieve this result will depend on the particular comonomer(s) being employed, the catalyst composition and particularly the molar ratio of aluminum to chromium, catalyst preparation conditions, and reactor temperature. The ratio of the comonomer to ethylene is controlled to obtain the desired resin density of copolymer product.

Various techniques for preventing fouling of the reactor and polymer agglomeration can be used. Illustrative of these techniques are the introduction of finely divided particulate matter to prevent agglomeration, as described in U.S. Pat. Nos. 4,994,534 and 5,200,477; the addition of negative charge generating chemicals to balance positive voltages or the addition of positive charge generating chemicals to neutralize negative voltage potentials as described in U.S. Pat. No. 4,803,251. Antistatic substances may also be added, either continuously or intermittently to prevent or neutralize electrostatic charge generation. Condensing mode operation such as disclosed in U.S. Pat. Nos. 4,543,399 and 4,588,790 can also be used to assist in heat removal from the fluid bed polymerization reactor. Liquid monomer in the bed can be practiced as disclosed in U.S. Pat. No. 6,627,713.

The conditions for polymerizations vary depending upon the monomers, catalysts and equipment availability. The specific conditions are known or readily derivable by those skilled in the art.

In some embodiments of this disclosure, polyolefins produced may include those made from olefin monomers such as ethylene and linear or branched higher alpha-olefin monomers containing 3 to about 20 carbon atoms. In other embodiments, homopolymers or interpolymers of ethylene and these higher alpha-olefin monomers, with densities ranging from about 0.905 g/cc to about 0.97 g/cc, may be made; densities ranging from about 0.915 to about 0.965 in other embodiments. Exemplary higher alpha-olefin monomers may include, for example, propylene, 1-butene, 1-pentene, 1-hexene, 4-methyl-1-pentene, 1-octene, and 3,5,5-trimethyl-1-hexene. Exemplary polyolefins may include ethylene-based polymers (at least 50 mole % ethylene), including ethylene-1-butene, ethylene-1-hexene, and ethylene-1-octene copolymers, such as high density polyethylene (HDPE), medium density polyethylene (MDPE) (including ethylene-butene copolymers and ethylene-hexene copolymers), low density polyethylene (LDPE), linear low density polyethylene (LLDPE), or homopolyethylene.

In certain embodiments, polymers of the present disclosure may have flow indices ($I_{21}$) ranging from about 0.1 g/10 min to about 1000 g/10 min. In other embodiments, polymers of the present disclosure may have flow indices ($I_{21}$) ranging from about 1 g/10 min to about 300 g/10 min. In yet other embodiments, polymers of the present disclosure may have flow indices ($I_{21}$) ranging from about 0.5 g/10 min to about 60 g/10 min.

In some exemplary embodiments, the processes and catalysts disclosed herein may be used to produce polyolefins such as ethylene/1-hexene copolymer or ethylene homopolymer under specific reactor conditions. For example, the $H_2/C_2$ gas molar ratio may be in the range of from about 0.01 to about 0.5. Oxygen add back may be in the range of from about 10 to about 600 ppbv relative to the ethylene feed rate to the reactor. The reactor operating temperature may be in the range of from about 75 to about 120° C. The reactor may be optionally run in the condensing mode.

The conditions for polymerizations vary depending upon the monomers, catalysts and equipment availability. The specific conditions are known or readily derivable by those skilled in the art.

Test Methods

The following test methods should be utilized to obtain the numerical values for certain properties and features as set forth in the claims, e.g. density, productivity, chromium content, or flow indices or melt indices, although it is understood that those values also refer to any results obtained by other testing or measuring methods that might not necessarily be disclosed herein, provided such other testing or measuring methods are published, e.g., in at least one patent, patent application, or scientific publication. Also, it is understood that the values set forth in the claims may have some degree of error associated with their measurement, whether experimental, equipment, or operator error; and that any value in the claim is approximate only, and encompasses values that are plus or minus (+/−) 10% or even 20% from the measured value.

Density values are based on ASTM D1505.

Flow Index ($I_{21}$) values are based on ASTM D1238, run at 190° C., with 21.6 kg weight; the standard designation for that measurement is 190/21.60.

Melt Index ($I_2$) values are based on ASTM D1238, run at 190° C., with 2.16 kg weight; the standard designation for that measurement is 190/2.16.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

High-density polyethylene resin samples were prepared using catalysts made using different addition rates of reducing agent, different stirring rates, and also different polymerization conditions, as noted in Tables 1, 2, and 3 below. The examples in Table 1 are chromium oxide catalysts made on either a pilot scale or a commercial scale but polymerized in a laboratory scale slurry reactor. The examples in Table 2 are chromium oxide catalysts made on either a pilot scale or a commercial scale but polymerized in a gas-phase, fluidized-bed polymerization pilot reactor. The examples in Table 3 are silyl chromate catalysts made on a pilot scale and polymerized in a laboratory scale slurry reactor. These examples collectively illustrate the controlling or tailoring of the flow index response of a catalyst by using selected addition rates of reducing agent (including the feed rate and the time period over which the reducing agent is added), and selected agitation rates.

General Catalyst Preparation

Chromium Oxide Catalysts

Certain catalysts employed in the Examples, specifically those using 957HS chromium on silica support, were prepared on a commercial scale as follows. About 408.2 kg (900 pounds) of a porous silica support containing 2.5 weight percent chromium acetate, which amounts to about 0.5% Cr content (Grade Sylopol 957HS chromium on silica, produced by Davison Catalyst division of W. R. Grace and Co.) having a particle size of about 40 microns and a surface area of about 300 square meters per gram were charged to a fluidized bed heating vessel. There it was heated slowly at a rate of about 50° C. per hour under dry nitrogen up to 325° C. and held at that temperature for about 2 hours. The nitrogen stream was then replaced with a stream of dry air and the catalyst composition was heated slowly at a rate of about 50° C. per hour to 600° C. where it was activated for about 6 hours. The activated catalyst was then cooled with dry air (at ambient temperature) to about 300° C. and further cooled from 300° C. to room temperature with dry nitrogen (at ambient temperature). The resulting cooled powder was stored under nitrogen atmosphere until treated with a reducing agent as described below.

Certain catalysts employed in the Examples, specifically those using C35300MS chromium on silica support, were prepared on a commercial scale as follows. About 317.5 kg (700 pounds) of a porous silica support containing about 5 weight percent chromium acetate (Grade C35300MS chromium on silica, produced by PQ Corporation), which amounts to about 1 weight percent Cr content, having a particle size of about 90 microns and a surface area of about 500 square meters per gram was charged to a fluidized bed heating vessel. There it was heated slowly at a rate of about 50° C. per hour under dry nitrogen up to 200° C. and held at that temperature for about 4 hours. Next it was heated slowly at a rate of about 50° C. per hour under dry nitrogen up to 450° C. and held at that temperature for about 2 hours. The nitrogen stream was then replaced with a stream of dry air and the catalyst composition was heated slowly at a rate of about 50° C. per hour to 600° C. where it was activated for about 6 hours. The activated catalyst was then cooled with dry air (at ambient temperature) to about 300° C. and further cooled from 300° C. to room temperature with dry nitrogen (at ambient temperature). The resulting cooled powder was stored under nitrogen atmosphere until treated with a reducing agent as described below.

In a typical chromium oxide catalyst reduction, the catalyst was placed in a vertical catalyst blender with a helical ribbon agitator under an inert atmosphere. Degassed and dried hexane or isopentane solvent was added to adequately suspend the supported catalyst. For catalysts using 957HS starting material in the Examples, about 5.8 liters of solvent were charged per kilogram (0.70 gallons per pound) of support. For catalysts using C35300MS starting material in the Examples, about 7.1 liters of solvent were charged per kilogram (0.89 gallons per pound) of support. DEAlE, available from Akzo Nobel, and obtained as a 25 wt % solution in isopentane or hexane, was then added to the surface of the catalyst slurry at a selected rate over a selected time period to obtain a selected molar ratio of DEAlE/Cr. In Example 19 only, the DEAlE was added through a diptube extending about ⅔rds of the way down into the slurry from the surface. The mixture was agitated at a selected agitation rate at a temperature of approximately 45° C. during the selected addition time. The mixture was further agitated at a controlled rate for about 1 hour on a pilot scale or 2 hours on a commercial scale. Then the solvent was substantially removed by drying at a jacket temperature of approximately 70° C. and slightly above atmospheric pressure for about 14 to 18 hours. Pilot-scale 957HS-based and C35300MS-based catalysts were dried for 16 hours. Plant-scale 957HS-based catalysts were dried for 14 hours. Plant-scale C35300MS-based batches were dried for 18 hours. The resulting dry, free flowing powder was then stored under nitrogen until used.

Silyl Chromate Catalysts

Certain catalysts employed in the Examples, specifically those using a silyl chromate compound on silica support, were prepared on a commercial scale as follows. About 408.2 kg (900 pounds) of porous silica support (Grade Sylopol 955 chromium on silica, produced by Davison Catalyst division of W. R. Grace and Co.), having a particle size of about 40 microns and a surface area of about 300 square meters per gram was charged to a fluidized bed heating vessel. There it was heated slowly at a rate of about 100° C. per hour under dry nitrogen up to 325° C. and held at that temperature for about 2 hours. The nitrogen stream was then replaced with a stream of dry air and the silica support was heated slowly at a rate of about 100° C. per hour to 600° C. where it was activated for about 4 hours. The calcined support was then cooled with dry air (at ambient temperature) to about 300° C. and further cooled from 300° C. to room temperature with dry nitrogen (at ambient temperature). The resulting cooled powder was stored under nitrogen atmosphere until treated with a chromium compound and then a reducing agent as described below.

In supporting the silyl chromate compound on the silica, the support was placed in a vertical catalyst blender with a helical ribbon agitator under an inert atmosphere. For catalysts in the Examples, about 5.8 liters of degassed and dried hexane solvent were charged per kilogram (0.70 gallons per pound) of silica. The resulting mixture was stirred and heated to about 45° C. Then 3.15 kilograms of bis(triphenylsilyl) chromate was charged for every 100 kilograms of silica. This was stirred at about 45° C. for 10 hours. A 25 wt % solution of DEAlE in isopentane or hexane was then added to the surface of the catalyst slurry at a selected rate over a selected time period to obtain a selected molar ratio of DEAlE/Cr. The mixture was agitated at a selected agitation rate at a temperature of approximately 45° C. during the selected addition time. The mixture was further agitated at a selected rate for about 1 hour on a pilot scale or 2 hours on a commercial scale. Then the solvent was substantially removed by drying at a jacket temperature of approximately 75° C. and slightly above atmospheric pressure for about 24 hours. The resulting dry, free flowing powder was then stored under nitrogen until used.

Catalysts reduced on a pilot plant scale involved quantities that were proportionately smaller by a factor of about 600 to 1 than the quantities given above for commercial scale chromium-based catalyst activations.

General Laboratory Testing Procedures for Catalysts.

Certain catalyst samples that were prepared as described above and shown in Tables 1 and 3 were tested for their flow index response in a laboratory 1-liter slurry reactor. In a typical slurry polymerization (EP 0931 797 A1), catalyst was charged to a reactor equipped with a mechanical stirrer and a jacket for internal temperature control. In the Examples 0.149 to 0.164 g of catalyst was introduced followed by 600 mL of dry purified isobutane. 500 cc of hydrogen was batch charged, the reactor was brought up to reaction temperature (95° C. in these examples), during which step ethylene feed was started, and 10 mL of 1-hexene was batch charged through a bomb. The ethylene was fed continuously upon demand to maintain an ethylene partial pressure of 13.8 bar (200 psi). Ethylene uptake was measured with an electronic flow meter. Polymerizations were run until about 180 grams of polyethylene were made. The reactor was opened after depressurization and cooled in order to recover the polymer. After drying, polymer flow index was measured.

General Pilot Plant Testing Procedure for Catalysts

Certain catalyst samples that were prepared as described above and shown in Tables 2A, 2B, and 2C were tested for their flow index response making ethylene/1-hexene copolymer product in a 14-inch diameter pilot-scale fluidized-bed reactor. Cycle gas was circulated through the reactor and heat of reaction was removed in a heat exchanger. Catalyst powder was continuously introduced into the fluidized bed. Monomers, hydrogen and oxygen were fed into the cycle gas piping. Product was transferred intermittently into a product chamber, depressurized, degassed briefly, and then discharged into a drum. Certain conditions in the fluidized-bed reactor were maintained at a constant value or in a narrow range for the related experiments within each set of tests that were conducted. Ethylene partial pressure was about 13.8 bar (200 psi). The $H_2/C_2$ molar gas ratio in the cycle gas was maintained at about 0.05. Total reactor pressure was about 24.8 bar absolute (360 psia). Superficial gas velocity within the fluidized bed was 1.3-1.8 ft/s. Average residence time of resin in the reactor ranged from 1.9 to 2.4 hours. Parameters, such as reactor temperature, hexene ratio, oxygen ratio, and catalyst preparation conditions that were changed in the Examples, are summarized in Tables 2A, 2B, and 2C, along with the resulting polymer properties.

Examples 1 Through 10

In Examples 1 through 10, DEAlE-reduced chromium oxide-based catalysts were prepared on a pilot scale using activated 957HS support as described above and then tested for flow index response in a laboratory slurry polymerization reactor. Catalyst preparation conditions used are indicated in Table 1 (agitation rate during DEAlE addition and reaction, DEAlE/Cr ratio, and DEAlE feed time). Polymerization results are shown in Table 1 and in FIG. 1.

The results show that at a given agitation rate, and within a narrow range of DEAlE/Cr molar ratio, the measured flow index response increased with increasing DEAlE addition time. Examples 1 to 3 show that as the DEAlE addition time was increased from 10 minutes to 40 minutes to 80 minutes at 30 rpm, the measured flow index response significantly increased from 48 to 89 to 131 g/10 minutes. Examples 4 to 7 show that as the DEAlE addition time was increased from 10 minutes to 40 minutes at 37 rpm, the measured flow index response significantly increased, from about 50 to about 108 g/10 minutes. As the addition time was further increased to 80 minutes, the measured flow index response increased from about 108 to about 140-147 g/10 minutes. Examples 8 and 9 show that similar results were obtained from 10 to 40 minutes DEAlE addition time at a slightly higher agitation rate of 60 rpm. Example 10 shows that measured flow index response at 130 rpm was markedly higher than at 30, 37, or 60 rpm at 10 minutes DEAlE addition time. As shown by the examples above, it is possible to tailor the flow index response of pilot-scale DEAlE-reduced activated 957HS-based chromium oxide catalysts by varying the DEAlE addition time and the agitation rate.

Examples 11 Through 15

In Examples 11 through 15, DEAlE-reduced chromium oxide-based catalysts were prepared on a plant scale using activated 957HS support as described above and then tested for flow index response in a laboratory slurry polymerization reactor. Catalyst preparation conditions used are indicated in Table 1 (agitation rate during DEAlE addition and reaction, DEAlE/Cr ratio, and DEAlE feed time). Polymerization results are shown in Table 1 and in FIG. 2.

FIG. 2 shows that the plant-reduced catalysts of Examples 12 and 14 with DEAlE added over 40 minutes have approximately twice as large a measured flow index response compared with the catalysts of Examples 11, 13, and 15 with DEAlE added over 10 minutes. These catalysts were all made at 37 rpm and have the same range of DEAlE/Cr ratios. As shown in the Examples, it is possible to tailor the flow index response of plant-scale DEAlE-reduced activated 957HS-based chromium oxide catalysts by varying the DEAlE addition time.

Examples 16 Through 19

In Examples 16 through 19, DEAlE-reduced chromium oxide-based catalysts were prepared on a pilot scale using activated C35300MS support as described above and then tested for flow index response in a laboratory slurry polymerization reactor. Catalyst preparation conditions used are indicated in Table 1 (agitation rate during DEAlE addition and reaction, DEAlE/Cr ratio, and DEAlE feed time). Polymerization results are shown in Table 1 and in FIG. 3.

The results show that at a given agitation rate, and within a narrow range of DEAlE/Cr molar ratio, the measured flow index response increased with increasing DEAlE addition time. Examples 16 to 18 show that as the DEAlE addition time was increased from 10 minutes to 40 minutes to 80 minutes at 37 rpm, the measured flow index response significantly increased from 39 to 67 to 96 g/10 minutes. Example 19 shows that measured flow index response at 130 rpm even at 5 minutes DEAlE addition time was markedly higher than at 37 rpm at 10 minutes DEAlE addition time. As shown in the examples, it is possible to tailor the flow index response of pilot-scale DEAlE-reduced activated C35300MS-based chromium oxide catalysts by varying the DEAlE addition time and the agitation rate.

TABLE 1

Catalyst Preparation Conditions and Polymerization Results for Examples 1-19

| Example | Support material | Scale of catalyst preparation | Agitation rate (rpm) | Molar Ratio of DEAlE/Cr | DEAlE Addition Time (mins) | Measured Flow Index Response (g/10 min) | Polymer Density (g/cc) | Catalyst Activity (g PE/ g cat/1 hr) |
|---|---|---|---|---|---|---|---|---|
| 1 | 957HS | Pilot | 30 | 5.15 | 80 | 131 | 0.9595 | 1665 |
| 2 | 957HS | Pilot | 30 | 4.97 | 40 | 89 | 0.9559 | 1606 |
| 3 | 957HS | Pilot | 30 | 4.94 | 10 | 48 | 0.9552 | 1823 |
| 4 | 957HS | Pilot | 37 | 5.26 | 80 | 147 | 0.9607 | 1734 |
| 5 | 957HS | Pilot | 37 | 5.27 | 80 | 140 | 0.9602 | 1909 |
| 6 | 957HS | Pilot | 37 | 4.84 | 40 | 108 | 0.9585 | 1682 |
| 7 | 957HS | Pilot | 37 | 5.16 | 10 | 50 | 0.9537 | 1650 |
| 8 | 957HS | Pilot | 60 | 5.24 | 40 | 104 | 0.9577 | 1619 |
| 9 | 957HS | Pilot | 60 | 5.34 | 10 | 32 | 0.9515 | 1653 |
| 10 | 957HS | Pilot | 130 | 5.18 | 10 | 157 | 0.9588 | 1846 |
| 11 | 957HS | Plant | 37 | 3.41 | 10 | 57 | 0.9530 | 1994 |
| 12 | 957HS | Plant | 37 | 3.80 | 40 | 121 | 0.9574 | 1798 |
| 13 | 957HS | Plant | 37 | 3.86 | 10 | 60 | 0.9547 | 2244 |

TABLE 1-continued

Catalyst Preparation Conditions and Polymerization Results for Examples 1-19

| Example | Support material | Scale of catalyst preparation | Agitation rate (rpm) | Molar Ratio of DEAlE/Cr | DEAlE Addition Time (mins) | Measured Flow Index Response (g/10 min) | Polymer Density (g/cc) | Catalyst Activity (g PE/ g cat/1 hr) |
|---|---|---|---|---|---|---|---|---|
| 14 | 957HS | Plant | 37 | 4.86 | 40 | 134 | 0.9585 | 1660 |
| 15 | 957HS | Plant | 37 | 4.62 | 10 | 65 | 0.9570 | 1857 |
| 16 | C35300MS | Pilot | 37 | 4.37 | 80 | 96 | 0.9587 | 1525 |
| 17 | C35300MS | Pilot | 37 | 4.58 | 40 | 67 | 0.9570 | 1513 |
| 18 | C35300MS | Pilot | 37 | 4.63 | 10 | 39 | 0.9540 | 1565 |
| 19 | C35300MS | Pilot | 130 | 4.56 | 5 | 98 | 0.9600 | 1405 |

Examples 20 Through 30

In Examples 20 through 30, DEAlE-reduced chromium oxide-based catalysts were prepared on both pilot scale and plant scale using activated 957HS support and activated C35300MS support as described above and were then tested for flow index response in a pilot-scale fluidized-bed reactor. Catalyst preparation conditions used are indicated in Tables 2A, 2B, and 2C (37 rpm agitation rate during DEAlE addition and reaction, DEAlE/Cr ratio, and DEAlE addition time). Polymerization results are shown in Tables 2A, 2B, and 2C. The reactor operated well with no instances of resin agglomeration or disruption to the polymerization process.

The results in Table 2A show that at a given agitation rate, for catalysts with similar DEAlE/Cr molar ratios, the measured flow index response increases with increasing DEAlE addition time. In Examples 20 and 21, both tests were made at identical 101.7° C. reactor temperatures and other polymerization conditions were also held constant. Examples 20 and 21 show that as the DEAlE addition time was increased from 10 minutes to 40 minutes at 37 rpm for pilot reduced activated 957HS catalyst, the measured flow index response increased 69% from 7.2 to 12.2 g/10 minutes. In Examples 22 and 23 both tests were made at identical 104.0° C. reactor temperatures and other polymerization conditions were also held constant. Examples 22 and 23 show that as the DEAlE addition time was increased from 10 minutes to 40 minutes at 37 rpm for pilot reduced activated C35300MS catalyst, the measured flow index response increased 62% from 7.6 to 12.3 g/10 minutes.

In Examples 24 through 30, three sets of examples are given which are of a different nature than Examples 20 through 23. Polymerization results are shown in Tables 2B and 2C. Within each set, polymerization reactor temperature and hexene to ethylene gas phase molar ratios were varied for these catalysts with different flow index responses in order to make the same polymer density and about the same flow index. Other polymerization conditions were held constant within each set. Lower reactor temperature consistently leads to lower flow index and lower melt index for a given DEAlE-reduced chromium catalyst. By comparing how much the reactor temperature had to be adjusted for each catalyst in order to make the same polymer, one can see how much the catalyst flow index response was different.

Examples 24, 25, and 26 show that, as the DEAlE addition time was increased from 10 to 40 to 80 minutes at 37 rpm for plant reduced activated 957HS catalyst, the reactor temperature had to be lowered from 106.3 to 101 to 95.6° C. in order to make the same polymer flow index and density. Thus the measured flow index response significantly increased with DEAlE addition time.

For a different product, Examples 27 and 28 show that, as the DEAlE addition time was increased from 40 to 80 minutes at 37 rpm for plant reduced activated 957HS catalyst, the reactor temperature had to be lowered from 111 to 105° C. in order to make the same polymer flow index and density. As shown above, it is possible to tailor the flow index response of plant-scale DEAlE-reduced activated 957HS-based chromium oxide catalysts by varying the DEAlE addition time.

Examples 29 to 30 show that, as the DEAlE addition time was increased from 10 minutes to 40 minutes at 37 rpm for plant reduced activated C35300MS catalyst, the measured flow index response significantly increased. Surprisingly, the flow index of 8.69 g/10 minutes was higher with catalyst made at 40 minutes DEAlE addition time compared with 6.71 g/10 minutes with catalyst made at 10 minutes DEAlE addition time, even though flow index was expected to decrease in conjunction with a 10° C. decrease in reactor temperature. As shown in these examples, it is possible to tailor the flow index response of plant-scale DEAlE-reduced activated C35300MS-based chromium oxide catalysts by varying the DEAlE addition time.

TABLE 2A

Catalyst Information, Reaction Conditions, and Average Drum Resin Properties for Examples 20-23

| | EXAMPLE | | | |
|---|---|---|---|---|
| | 20 | 21 | 22 | 23 |
| Catalyst Info: | | | | |
| From Example Number | 7 | 6 | 18 | 17 |
| Scale Reduced | Pilot | Pilot | Pilot | Pilot |
| Support Type | 957HS | 957HS | C35300MS | C35300MS |
| Cr, wt % | 0.523 | 0.505 | 0.809 | 0.810 |
| DEAlE/Cr molar ratio | 5.16 | 4.84 | 4.63 | 4.58 |
| DEAlE Add. Time (min) | 10 | 40 | 10 | 40 |
| Agitation Speed (rpm) | 37 | 37 | 37 | 37 |

TABLE 2A-continued

Catalyst Information, Reaction Conditions, and Average Drum Resin Properties for Examples 20-23

| | EXAMPLE | | | |
|---|---|---|---|---|
| | 20 | 21 | 22 | 23 |
| Reaction Conditions: | | | | |
| Bed Temperature (° C.) | 101.7 | 101.7 | 104.0 | 104.0 |
| Reactor Pressure (psia) | 360 | 359 | 360 | 360 |
| C2H4 Partial Pressure (psia) | 200 | 200 | 200 | 200 |
| H2/C2H4 Ratio (molar) | 0.050 | 0.050 | 0.050 | 0.050 |
| C6H12/C2H4 Ratio (molar) | 0.0063 | 0.0063 | 0.00362 | 0.00380 |
| O2/C2H4 Ratio (ppbv) | 20 | 20 | 100 | 100 |
| Production Rate (lb/hr) | 72.5 | 72.7 | 64.5 | 55.8 |
| Bed Weight (lb) | 152 | 149 | 125 | 120 |
| Fluid Bulk Density (lb/ft3) | 20.2 | 19 | 14.3 | 15 |
| Avg. Bed Height (ft) | 8.2 | 8.5 | 9.5 | 8.8 |
| Residence Time (hr) | 2.1 | 2 | 1.9 | 2.2 |
| STY (lb/h/ft3) | 9.4 | 9.1 | 7.2 | 6.8 |
| Average Drum Resin Properties: | | | | |
| MI(I2) (dg/min) | 0.041 | 0.085 | 0.078 | 0.127 |
| FI(I21) (dg/min) | 7.2 | 12.2 | 7.6 | 12.3 |
| MFR (I21/I2) | 180 | 144 | 98.9 | 97.5 |
| Density (g/cm3) | 0.9485 | 0.9511 | 0.9499 | 0.9532 |
| Settled Bulk Density (lb/ft3) | 28.8 | 27.8 | 20.4 | 22.2 |
| Cr, ppmw | 0.79 | 0.79 | 1.87 | 1.66 |
| Catalyst Productivity (lb/lb) | 6642 | 6414 | 4497 | 5060 |
| Average Particle Size (in) | 0.0373 | 0.0302 | 0.0387 | 0.0362 |

TABLE 2B

Catalyst Information, Reaction Conditions, and Average Drum Resin Properties for Examples 24-28

| EXAMPLE | 24 | 25 | 26 | 27 | 28 |
|---|---|---|---|---|---|
| Catalyst Info: | | | | | |
| From Example Number | 13 | 11 | — | — | — |
| Scale Reduced | Plant | Plant | Plant | Plant | Plant |
| Support Type | 957HS | 957HS | 957HS | 957HS | 957HS |
| Cr, wt % | 0.515 | 0.518 | 0.492 | 0.499 | 0.506 |
| DEAlE/Cr molar ratio | 3.86 | 3.80 | 3.97 | 5.31 | 5.01 |
| DEAlE Add. Time (min) | 10 | 40 | 80 | 40 | 80 |
| Agitation Speed (rpm) | 37 | 37 | 37 | 37 | 37 |
| Reaction Conditions: | | | | | |
| Bed Temperature (° C.) | 106.3 | 101.0 | 95.6 | 111.0 | 105.0 |
| Reactor Pressure (psia) | 360 | 360.0 | 361.0 | 360.0 | 360.0 |
| C2H4 Partial Pressure (psia) | 200 | 200 | 200 | 200 | 200 |
| H2/C2H4 Ratio (molar) | 0.050 | 0.050 | 0.050 | 0.050 | 0.050 |
| C6H12/C2H4 Ratio (molar) | 0.00571 | 0.00902 | 0.01201 | 0.00282 | 0.00432 |
| O2/C2H4 Ratio (ppbv) | 20 | 20 | 20 | 20 | 20 |
| Production Rate (lb/hr) | 79.3 | 62.7 | 60.2 | 42.4 | 46.0 |
| Bed Weight (lb) | 153 | 147 | 147 | 125 | 131 |
| Fluid Bulk Density (lb/ft3) | 18.7 | 18.5 | 19.1 | 16.7 | 17.5 |
| Avg. Bed Height (ft) | 9.0 | 8.7 | 8.4 | 8.2 | 8.2 |
| Residence Time (hr) | 1.93 | 2.35 | 2.45 | 2.97 | 2.86 |
| STY (lb/h/ft3) | 9.4 | 7.6 | 7.6 | 5.5 | 5.9 |
| Average Drum Resin Properties: | | | | | |
| MI(I2) (dg/min) | 0.093 | 0.072 | 0.052 | 0.36 | 0.28 |
| FI(I21) (dg/min) | 11.0 | 10.2 | 10.3 | 28.7 | 28.0 |
| MFR(I21/I2) | 120 | 142 | 191 | 80.9 | 100 |
| Density (g/cm3) | 0.9485 | 0.9476 | 0.9487 | 0.9553 | 0.9562 |
| Settled Bulk Density (lb/ft3) | 28.0 | 28.4 | 29.0 | 27.3 | 28.3 |
| Cr, ppmw | 0.78 | 0.71 | 0.69 | 0.89 | 0.90 |
| Catalyst Productivity (lb/lb) | 6619 | 7316 | 7133 | 5658 | 5631 |
| Average Particle Size (in) | 0.0325 | 0.0255 | 0.0257 | 0.0216 | 0.0223 |

TABLE 2C

Catalyst Information, Reaction Conditions, and Average Drum Resin Properties for Examples 29-30

| | EXAMPLE | |
|---|---|---|
| | 29 | 30 |
| Catalyst Info: | | |
| From Example Number | — | — |
| Scale Reduced | Plant | Plant |
| Support Type | C35300MS | C35300MS |
| Cr, wt % | 0.862 | 0.889 |
| DEAlE/Cr molar ratio | 3.99 | 4.21 |
| DEAlE Add. Time (min) | 10 | 40 |
| Agitation Speed (rpm) | 37 | 37 |
| Reaction Conditions: | | |
| Bed Temperature (° C.) | 102 | 92 |
| Reactor Pressure (psia) | 360 | 361 |
| C2H4 Partial Pressure (psia) | 200 | 200 |
| H2/C2H4 Ratio (molar) | 0.058 | 0.065 |
| C6H12/C2H4 Ratio (molar) | 0.00899 | 0.01719 |
| O2/C2H4 Ratio (ppbv) | 20 | 20 |
| Production Rate (lb/hr) | 65.3 | 67.6 |
| Bed Weight (lb) | 157 | 147 |
| Fluid Bulk Density (lb/ft3) | 18.6 | 19 |
| Avg. Bed Height (ft) | 8.9 | 8.2 |
| Residence Time (hr) | 2.41 | 2.19 |
| STY (lb/h/ft3) | 7.8 | 8.8 |
| Average Drum Resin Properties: | | |
| MI(I2) (dg/min) | | 0.06 |
| FI(I21) (dg/min) | 6.71 | 8.69 |
| MFR (I21/I2) | 113 | |
| Density (g/cm3) | 0.9450 | 0.9457 |
| Settled Bulk Density (lb/ft3) | 26.0 | 27.6 |
| Cr, ppmw | 1.48 | 1.9 |
| Catalyst Productivity (lb/lb) | 5836 | 4683 |
| Average Particle Size (in) | 0.0419 | 0.032 |

Examples 31 Through 34

In Examples 31 through 34, DEAlE-reduced bis(triphenylsilyl) chromate-based catalysts were prepared on a pilot scale using dehydrated 955 silica support as described above and then tested for flow index response in a laboratory slurry polymerization reactor. Catalyst preparation conditions used are indicated in Table 3 (agitation rate during DEAlE addition and reaction, DEAlE/Cr ratio, and DEAlE feed time). Polymerization results are shown in Table 3 and in FIG. 4.

TABLE 3

Catalyst Preparation Conditions, and Polymerization Results for Examples 30-34

| | Example | | | |
|---|---|---|---|---|
| | 31 | 32 | 33 | 34 |
| Support Material | SiCr/955 | SiCr/955 | SiCr/955 | SiCr/955 |
| Scale of Catalyst Preparation | Pilot | Pilot | Pilot | Pilot |
| Agitation speed (rpm) | 37 | 37 | 130 | 130 |
| Molar Ratio Of DEAlE/Cr | 5.73 | 5.73 | 4.53 | 5.91 |
| DEAlE Addition Time (minutes) | 3 | 3 | 3 | 5 |
| Measured Flow Index Response (g/10 min) | 62 | 70 | 213 | 234 |
| Polymer Density (g/cc) | 0.9554 | 0.9566 | 0.9610 | 0.9622 |
| Catalyst Activity (g PE/g cat per 1 hr) | 385 | 398 | 780 | 789 |

FIG. 4 shows that the pilot-reduced catalysts of Examples 33 and 34 with DEAlE added over 3-5 minutes at 130 rpm have approximately three times as large a measured flow index response compared with the catalysts of Examples 31 and 32 with DEAlE added over 3 minutes at 37 rpm, despite these catalysts having comparable DEAlE/Cr ratios. As shown in these examples, it is possible to tailor the flow index response of pilot-scale DEAlE-reduced 955-supported silyl chromate catalysts by varying the agitation rate during DEAlE addition and reaction.

These examples illustrate, among other things, for reduced chromium oxide catalysts and reduced silyl chromate catalysts the surprising effect on flow index response of using differing reducing agent addition times and different agitation rates in both a fluidized-bed gas phase polymerization process and in a slurry polymerization process, for polyethylene copolymers, which included ethylene units as well as other monomeric units. These surprisingly strong effects may be utilized to tailor the flow index response of a catalyst so as to make target polymers with high, medium, or low flow indices under a variety of polymerization conditions.

As described above and illustrated in the Examples, the flow index response of a chromium-based catalyst can be tailored by contacting the chromium-based catalyst with a reducing agent fed at a selected feed rate over a selected time period and optionally at a selected agitation rate. The use of the chromium-based catalyst compositions described herein, wherein the catalysts have a tailored or selected flow index response, provides a capacity for polymerization process flexibility, which has significant commercial application in the polymerization of polyolefins.

In addition, embodiments of the present disclosure provide a process for producing chromium-based catalyst compositions with a selected flow index response. Yet other embodiments provide a process for producing polyolefins comprising forming a chromium-based catalyst composition with a selected flow index response, as described herein, and contacting the chromium-based catalyst composition with olefins under polymerization conditions.

Advantageously, embodiments disclosed herein provide for a method to tailor the flow index response of chromium-based catalysts. The ability to select the flow index response of a chromium-based catalyst further advantageously allows for a greater number of polymerization products to be produced with chromium-based catalysts than was previously possible. Additionally, chromium-based catalysts having a low or moderate flow index response advantageously allow lower flow index products to be manufactured with chromium-based catalysts at significantly higher reactor temperatures, where cooling is more efficient and higher production rates may be achieved. As another advantage, chromium-based catalysts having a selected flow index response result in lower hydrogen feed rates to the reactor. As yet another advantage, the greater flexibility for chromium-based catalysts to produce polymers of varying flow indices allows for improved grade transitions.

The phrases, unless otherwise specified, "consists essentially of" and "consisting essentially of" do not exclude the presence of other steps, elements, or materials, whether or not, specifically mentioned in this specification, as long as such steps, elements, or materials, do not affect the basic and novel characteristics of the invention. Additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed:

1. A process for producing a catalyst composition for the polymerization of olefins, the process comprising:
    contacting a supported chromium-based catalyst with a reducing agent at a feed rate over an addition time period from about 30 seconds to about 500 minutes, and concurrently, agitating the chromium-based catalyst at an agitation rate in the range of 5 to 200 rpm for a reaction time of from about 5 minutes to about 240 minutes to produce a catalyst composition having a flow index response within a selected range,
    wherein the feed rate, addition time, and agitation rate are selected to control the flow index response of the catalyst composition within the selected range, and
    further characterized in that the flow index, $I_{21}$, measured according to ASTM D-1238 (190° C./21.6 kg), of polymers produced by the catalyst composition ranges from about 0.1 g/10 mint to 1000 g/10 min.

2. The process of claim 1, wherein the selected reaction time is in the range from about 30 minutes to about 180 minutes.

3. The process of claim 1, wherein the supported chromium-based catalyst comprises a supported chromium oxide catalyst.

4. The process of claim 3, further comprising activating at least one of a supported chromic acetyl acetonate, chromic halide, chromic nitrate, chromic acetate, chromic sulfate, ammonium chromate, and ammonium dichromate by heating to a temperature ranging from about 300° C. to about 900° C. under oxidizing conditions to form the supported chromium oxide catalyst.

5. The process of claim 1, wherein the supported chromium-based catalyst comprises a supported silyl chromate catalyst.

6. The process of claim 5, further comprising:
    calcining a silica support at a temperature ranging from about 400° C. to about 850° C.; and
    contacting a silyl chromate compound with the calcined silica support to form the supported silyl chromate catalyst.

7. The process of claim 5, wherein the silyl chromate compound comprises at least one of a bis-triethylsilyl chromate, a bis-tributylsilyl chromate, a bis-triisopentylsilyl chromate, a bis-tri-2-ethylhexylsilyl chromate, a bis-tridecylsilyl chromate, a bis-tri(tetradecyl)silyl chromate, a bis-tribenzylsilyl chromate, a bis-triphenylethylsilyl chromate, a bis-triphenylsilyl chromate, a bis-tritolylsilyl chromate, a bis-trixylylsilyl chromate, a bis-trinaphthylsilyl chromate, a bis-triethylphenylsilyl chromate, a bis-trimethylnaphthylsilyl chromate, a polydiphenylsilyl chromate, and a polydiethylsilyl chromate.

8. The process of claim 1, wherein the reducing agent comprises at least one of an alkyl aluminum and an alkyl aluminum alkoxide.

9. The process of claim 8, wherein the alkyl aluminum alkoxide comprises at least one of diethyl aluminum methoxide, diethyl aluminum ethoxide, diethyl aluminum propoxide, dimethyl aluminum ethoxide, di-isopropyl aluminum ethoxide, di-isobutyl aluminum ethoxide, methyl ethyl aluminum ethoxide, and mixtures thereof.

10. The process of claim 1, wherein the agitating is performed with at least one of a helical ribbon agitator, a conical agitator, or a combination of a helical ribbon agitator or a conical agitator with an impeller.

11. The process of claim 1, wherein at an agitation rate of less than about 70 rpm the selected time period for adding the reducing agent is decreased in order to lower the flow index response.

12. The process of claim 1, wherein the selected agitation rate is less than 70 rpm and the selected addition time is less than 20 minutes.

13. The process of claim 1, wherein the selected agitation rate is less than 70 rpm and the selected addition time is greater than 20 minutes.

14. The process of claim 1, wherein the selected agitation rate is greater than 70 rpm and the selected addition time is greater than 20 minutes.

15. The process of claim 1, wherein the resulting catalyst composition has a molar ratio of reducing agent to chromium ranging from about 0.5 to about 8.

16. The process of claim 1, wherein the supported chromium-based catalyst comprises a silica-containing support selected from the group consisting of silica having: (a) a pore volume of about 1.1 to about 1.8 cm$^3$/g and a surface area of about 245 to about 375 m$^2$/g, (b) a pore volume of about 2.4 to about 3.7 cm$^3$/g and a surface area of about 410 to about 620 m$^2$/g, and (c) a pore volume of about 0.9 to about 1.4 cm$^3$/g and a surface area of about 390 to about 590 m$^2$/g.

17. The process of claim 3, wherein the process further comprises:
activating a supported chromic acetate compound by heating to a temperature in the range from about 500° C. to about 850° C. under oxidizing conditions to produce the chromium oxide catalyst.

18. The process of claim 5, wherein the process further comprises:
calcining a silica support at a temperature of about 600° C.; and
contacting a bis(triphenylsilyl) chromate compound with the calcined silica to form the supported silyl chromate catalyst.

19. The process of claim 18, wherein the selected addition time period is in the range from 0.5 to 10 minutes.

20. A process for producing a polyolefin, the process comprising:
producing a catalyst composition by contacting a supported chromium-based catalyst with a reducing agent fed at a selected feed rate over a selected addition time period, wherein the selected addition time period is within the range of from about 30 seconds to about 500 minutes, and concurrently, agitating the chromium-based catalyst at a selected agitation rate in the range of 5 to 200 rpm for a selected reaction time, wherein the selected reaction time is in the range of from about 5 minutes to about 240 minutes; and
contacting the catalyst composition with olefins under polymerization conditions; and further characterized in that the flow index, $I_{21}$, measured according to ASTM D-1238 (190 ° C./21.6 kg), of polymers produced by the catalyst composition ranges from about 0.1 g/10 min to 1000 g/10 min.

21. The process of claim 20, wherein the catalyst composition is contacted with olefins in a gas-phase polymerization reactor.

22. The process of claim 20, wherein the olefins comprise at least one of ethylene, propylene, 1-butene, 4-methyl-1-pentene, 1-hexene and 1-octene.

23. The process of claim 20, wherein the polyolefin is an ethylene-based polymer having a density in the range from about 0.915 to about 0.965 g/cc.

24. The process of claim 20, wherein the reactor is operated in condensing mode.

25. The process of claim 1, wherein at a selected agitation rate of less than about 70 rpm, the time period for adding the reducing agent is increased in order to increase the flow index response.

26. The process of claim 1, wherein the selected agitation rate is greater than 70 rpm and the selected addition time is less than 20 minutes.

* * * * *